US008424042B2

(12) United States Patent
Yamamoto et al.

(10) Patent No.: US 8,424,042 B2
(45) Date of Patent: Apr. 16, 2013

(54) INFORMATION PROCESSING APPARATUS, INFORMATION PROCESSING METHOD, INFORMATION PROCESSING PROGRAM, AND INFORMATION PROCESSING SYSTEM

(75) Inventors: Kazuyuki Yamamoto, Kanagawa (JP); Hidetoshi Kabasawa, Saitama (JP)

(73) Assignee: Sony Corporation (JP)

( * ) Notice: Subject to any disclaimer, the term of this patent is extended or adjusted under 35 U.S.C. 154(b) by 654 days.

(21) Appl. No.: 12/077,257

(22) Filed: Mar. 18, 2008

(65) Prior Publication Data

US 2008/0244677 A1 Oct. 2, 2008

(30) Foreign Application Priority Data

Mar. 30, 2007 (JP) ............................... P2007-094013

(51) Int. Cl.
*H04N 5/445* (2011.01)

(52) U.S. Cl.
USPC .................. 725/58; 725/51; 725/55; 725/110

(58) Field of Classification Search .................... 725/51, 725/55, 58, 110
See application file for complete search history.

(56) References Cited

U.S. PATENT DOCUMENTS

| | | | | |
|---|---|---|---|---|
| 7,673,315 | B1 * | 3/2010 | Wong et al. | 725/51 |
| 2005/0060072 | A1 | 3/2005 | Harumoto et al. | |
| 2007/0087688 | A1 | 4/2007 | Kim et al. | |
| 2008/0155607 | A1 * | 6/2008 | Klappert | 725/58 |
| 2008/0235739 | A1 * | 9/2008 | Coebergh Van Den Braak | 725/86 |

FOREIGN PATENT DOCUMENTS

| | | | |
|---|---|---|---|
| EP | 1306992 | A2 | 5/2003 |
| EP | 1739869 | A1 | 1/2007 |
| JP | 2001-109737 | A | 4/2001 |
| JP | 2002077788 | A | 3/2002 |
| JP | 2003-015644 | A | 1/2003 |
| JP | 2003-150413 | A | 5/2003 |
| JP | 2004-110677 | A | 4/2004 |
| JP | 2004-357035 | A | 12/2004 |
| JP | 2005-217972 | A | 8/2005 |
| JP | 2005-277585 | A | 10/2005 |
| JP | 2005-286761 | A | 10/2005 |
| JP | 2006-054570 | A | 2/2006 |
| JP | 2006-074385 | A | 3/2006 |
| JP | 2006-101093 | A | 4/2006 |
| JP | 2006-222557 | A | 8/2006 |

(Continued)

OTHER PUBLICATIONS

European Search Report EP Application No. 08153395, dated Feb. 5, 2013.

(Continued)

*Primary Examiner* — Kristine Kincaid
*Assistant Examiner* — Sumaiya A Chowdhury
(74) *Attorney, Agent, or Firm* — Lerner, David, Littenberg, Krumholz & Mentlik, LLP

(57) ABSTRACT

In an information processing apparatus, identification information identifying a specified broadcast content is converted into identification information identifying another broadcast content corresponding to the originally specified broadcast content, in accordance with table information indicating a correspondence among a plurality of pieces of identification information respectively identifying broadcast contents thereby indicating a correspondence among the broadcast contents.

12 Claims, 17 Drawing Sheets

FOREIGN PATENT DOCUMENTS

| | | | |
|---|---|---|---|
| JP | 2006-270255 | A | 10/2006 |
| JP | 2006-279241 | A | 10/2006 |
| JP | 2006352264 | A | 12/2006 |
| JP | 2007-006334 | A | 1/2007 |
| JP | 2007-081816 | A | 3/2007 |
| KR | 0663473 | | 12/2006 |
| KR | 0688019 | | 2/2007 |
| WO | 2007061258 | A1 | 5/2007 |

OTHER PUBLICATIONS

Vare J et al: "Soft Handover in Terrestrial Broadcast Networks", Mobile Data Management, 2004. Proceedings. 2004 IEEE International Conference on Berkeley,CA, USA, Jan. 19-22, 2004, Los Alamitos, CA, USA. IEEE Comput. Soc, US, Jan. 19, 2004, pp. 236-242, XP 010680966.

* cited by examiner

FIG. 6

321

| FIRST BROADCAST WAVE PROGRAM ID | SECOND BROADCAST WAVE PROGRAM ID |
|---|---|
| a | A |
| b | B |
| c | C |
| ⋮ | ⋮ |

FIG. 8

| COMMAND | TIME | PROCESS |
|---|---|---|
| 1) PROTECT | 1) PAST | SET DATA PROTECTION FLAG |
| | 2) PRESENT | SET DATA PROTECTION FLAG |
| | 3) FUTURE | SET DATA PROTECTION FLAG IN ADVANCE |
| | 4) SERIES | SET DATA PROTECTION FLAG FOR IDS OF A SERIES OF PROGRAMS OR THE LIKE |
| 2) DELETE | 1) PAST | DELETE |
| | 2) PRESENT | STOP RECORDING AND DELETE RECORDED PROGRAM DATA |
| | 3) FUTURE | DON'T RECORD |
| | 4) SERIES | DELETE ALREADY RECORDED PROGRAM DATA AND DON'T RECORD PROGRAMS THAT WILL BE BROADCAST IN FUTURE |

FIG. 12

| COMMAND | TIME | PROCESS |
|---|---|---|
| 1 ) RECORD | 1 ) PAST | 1 ) DO NOTHING |
| | | 2 ) RECORD PROGRAM WHEN IT IS REBROADCAST (AND SET DATA PROTECTION FLAG) |
| | 2 ) PRESENT | 1 ) START RECORDING WHEN RECORD COMMAND IS ISSUED (AND SET DATA PROTECTION FLAG) |
| | | 2 ) RECORD PROGRAM FROM THE BEGINNING OF PROGRAM WHEN PROGRAM IS REBROADCAST, AND REPLACE RECORDED PROGRAM DATA 1) WITH NEWLY RECORDED PROGRAM DATA |
| | 3 ) FUTURE | MAKE TIMER-CONTROLLED RECORDING SETTING (AND SET DATA PROTECTION FLAG IN ADVANCE) |
| | 4 ) SERIES | MAKE TIMER-CONTROLLED RECORDING SETTING FOR PROGRAM CORRESPONDING TO SPECIFIED ID (AND SET DATA PROTECTION FLAG) |
| 2 ) DELETE | 1 ) PAST | DELETE |
| | 2 ) PRESENT | STOP RECORDING AND DELETE ALREADY RECORDED PROGRAM DATA |
| | 3 ) FUTURE | DO NOTHING |
| | 4 ) SERIES | DELETE ALREADY RECORDED PROGRAM DATA |

FIG. 13A 321-1

| ONE-SEGMENT BROADCAST PROGRAM ID | FULL-SEGMENT BROADCAST PROGRAM ID |
|---|---|
| a | A |
| b | B |
| c | C |
| ⋮ | ⋮ |

FIG. 13B 321-2

| A-AREA FULL-SEGMENT BROADCAST PROGRAM ID | B-AREA FULL-SEGMENT BROADCAST PROGRAM ID |
|---|---|
| aa | AA |
| bb | BB |
| cc | CC |
| ⋮ | ⋮ |

FIG. 13C 321-3

| ONE-SEGMENT BROADCAST PROGRAM ID | FULL-SEGMENT BROADCAST PROGRAM ID |
|---|---|
| a3 | A1,A2,A3 |
| b2 | B2,B3 |
| c2 | C1,C2,C3,C4 |
| ⋮ | ⋮ |

INFORMATION PROCESSING APPARATUS, INFORMATION PROCESSING METHOD, INFORMATION PROCESSING PROGRAM, AND INFORMATION PROCESSING SYSTEM

CROSS-REFERENCE TO RELATED APPLICATIONS

The present application claims priority from Japanese Patent Application No. JP 2007-094013 filed in the Japanese Patent Office on Mar. 30, 2007, the entire content of which is incorporated herein by reference.

BACKGROUND OF THE INVENTION

1. Field of the Invention

The present invention relates to an information processing apparatus, an information processing method, an information processing program, and an information processing system, and more particularly, to an information processing apparatus, an information processing method, an information processing program, and an information processing system, capable of allowing a user to easily save a content.

2. Description of the Related Art

In recent years, a wide variety of broadcast services have become available. A specific example is a broadcast service of providing contents such as television program contents using terrestrial analog broadcasting, terrestrial digital broadcasting, satellite broadcasting using a BS (Broadcasting Satellite) or a CS (Communication Satellite), CATV (Community Antenna Television) broadcasting using a cable, or IPTV broadcasting via the Internet using IP (Internet Protocol).

To receive such a wide variety of broadcast services, various types of apparatus adapted to receive (acquire) contents are available. Some apparatus capable of not only receiving and storing (recording) a television program in accordance with a command issued by a user but also capable of recoding all receivable programs so that a user is allowed to view a desired program at a desired time without having to perform a particular recording operation. This type of apparatus is known as a home server. There is also available a portable terminal apparatus such as a portable telephone device or a notebook type personal computer having the capability of receiving television broadcasting at an outdoor location.

A typical one of various kinds of broadcast services is a terrestrial digital broadcasting service performed using 12 segments of a total of 13 segments of a 6 MHz broadcasting band (hereinafter, referred to simply as a full-segment broadcast service (note that "full-segment" is herein used to express such a type of broadcasting service although not all 13 segments are used but only 12 segments of the total of 13 segments are actually used)) and another typical broadcast service is a terrestrial digital broadcasting service performed using remaining one segment of the total of 13 segments to provide video/audio data or other data to portable telephone devices or mobile terminal devices (hereinafter, referred to simply as a one-segment broadcast service). In many cases, a television program provided by full-segment broadcasting is also provided at the same time by one-segment broadcasting. That is, the same television program content is broadcast in both formats according to the same schedule. However, full-segment programs are broadcast with a resolution of 1920×1080, while one-segment programs are broadcast with a resolution of 320×240. One-segment programs are broadcast at a lower transmission rate than full-segment programs so that portable terminal apparatuses can receive them.

In general, portable terminal apparatuses designed to receive a one-segment television signal have a lower display resolution and have a lower storage capacity because of limitations on size and power consumption, than apparatuses designed to be used in a house to receive a full-segment broadcast signal. Besides, in many cases, portable terminal apparatuses are used in unstable receiving circumstances. Thus, television program data recorded on a portable terminal apparatus is generally worse in quality than those recorded on an in-house apparatus. Therefore, in order to retain recorded television programs for a long time to enjoy viewing them many times, it is more desirable to record programs in a high-quality state, and it is undesirable to record programs on a portable terminal apparatus having poor recording performance that does not allow a long program to be recorded with high quality.

One technique to avoid the above problem is to record a full-segment program on an in-house high-performance apparatus (a home server) and transfer recorded data from it to a portable terminal apparatus. In this case, when high-resolution program data recorded on the home server is sent to the portable terminal apparatus, the high-resolution program data is converted into low-resolution program data because the portable terminal apparatus is capable of handling only low-resolution program data (for example, see Japanese Unexamined Patent Application Publication No. 2006-101093 or Japanese Unexamined Patent Application Publication No. 2004-357035).

Japanese Unexamined Patent Application Publication No. 2006-101093 discloses a technique to convert a program data recorded in a recording apparatus into a form compressed at a compression ratio $\alpha 1$ higher than a compression ratio $\alpha 0$ when the program data is transferred from the recording apparatus to a playback apparatus. In a technique disclosed in Japanese Unexamined Patent Application Publication No. 2004-357035, if a video server receives a request issued by a portable information terminal apparatus, video server transfers video data recorded in a compressed form in a storage medium of the video server to the portable information terminal apparatus at a low transmission rate. The portable information terminal apparatus edits the received video data and returns the resultant edited video data to the video server.

SUMMARY OF THE INVENTION

In the techniques described above, when a user is out of his/her house in which a home server is installed, the user is not allowed to give a record command to the home server. Although it is allowed to record a program on a portable terminal apparatus and transfer the recorded program data to the home server, the resultant recorded program data has low image quality as described above. Besides, in this case, it takes a long time to transfer the data. This is inconvenient for the user.

For a television program to be retained for a long time after being recorded, it is desirable to record the program on an in-house high-performance apparatus such as a television receiver/recorder or a home server so that the program is recorded in a high-quality form in a high-capacity storage area. In recent years, it has been proposed to perform communication between a portable terminal apparatus and an in-house high-performance apparatus thereby to allow the portable terminal apparatus to control the in-house high-performance apparatus to record a desired program.

However, when a one-segment program is broadcast, a full-segment program which is the same in content as the one-segment program is not necessarily broadcast according to the same schedule. If one-segment programs and full-segment programs are broadcast according to exactly the same schedule, it is easy for the portable terminal apparatus to specify, on the basis of the broadcasting schedule, a program to be recorded on the in-house high-performance apparatus. However, in a case where there is a difference in schedule between one-segment broadcasting and full-segment broadcasting, it is difficult for the portable terminal apparatus to determine when a full-segment program corresponding to a particular one-segment program is scheduled to be broadcast. Therefore, a user has to gain information about the date/time at which the full-segment program corresponding to the one-segment program is scheduled to be broadcast, and the user has to operate the portable terminal apparatus to remotely set the in-house high-performance apparatus to start recording the program at the right time and end the recording at the right time. Thus, a very troublesome setting operation is required.

Even in the case where full-segment programs and one-segment programs are broadcast according to the same broadcasting schedule, there is a possibility that a slight difference in broadcast timing can occur between full-segment programs and one-segment programs. This can make it difficult for the user of the portable terminal apparatus to specify the exactly right time at which the in-house high-performance apparatus should start or end the recording operation. For example, when the user wants to record, on the in-house high-performance apparatus, a full-segment program corresponding to a one-segment program being currently viewed on his/her portable terminal apparatus, it is necessary to issue a record command as quickly as possible. However, a troublesome operation is needed to specify a record start time and a record end time, and thus there is a possibility that a right timing of starting the recording is missed. It may be allowed to issue only a record start command, and a record end command may be issued at a later time. However, the user has to issue commands many times, and thus this is troublesome and inconvenient for the user.

It is more difficult for the user to control, via the portable terminal apparatus, the in-house high-performance apparatus to perform a complicated recording operation, such as recording a full-segment program that was broadcast in the past when it is re-broadcast, recording a program being currently broadcast starting from its beginning, recording a program related to another particular program, etc.

Even in a case where the portable terminal apparatus is capable of receiving the same broadcast wave as that the in-house high-performance apparatus receives, if the user is in a broadcast area different from the area in which the in-house apparatus is located, there is a possibility that there is a difference between a program received by the portable terminal apparatus and a program received by the in-house apparatus at the same time. In this case, it is difficult for the user to properly control, via the portable terminal apparatus, the in-house apparatus to record a correct program.

In view of the above, it is desirable to provide a technique that allows a user to easily and correctly control a recording operation of a content.

According to an embodiment of the present invention, there is provided an information processing apparatus including conversion means for converting identification information identifying a specified broadcast content into identification information identifying another broadcast content corresponding to the originally specified broadcast content, in accordance with table information indicating a correspondence among a plurality of pieces of identification information respectively identifying broadcast contents thereby indicating a correspondence among the broadcast contents.

The information processing apparatus may further include process execution means for executing a specified process on the broadcast content identified by the identification information given as a result of the conversion performed by the conversion means.

The information processing apparatus may further include search means for searching the broadcast content identified by the identification information given as the result of the conversion performed by the conversion means, and determination means for determining a specific process, corresponding to the specified process, to be actually performed on the broadcast content detected as a result of the search performed by the search means, wherein the process execution means may execute the specific process determined by the determination means.

The information processing apparatus may further include first acquisition means and second acquisition means, the first acquisition means being for acquiring identification information and command information both supplied from an external apparatus, the command information specifying a process to be performed on a broadcast content identified by the identification information, the second acquisition means being for acquiring the table information from the external apparatus, wherein the conversion means may convert, in accordance with the table information acquired by the second acquisition means, the identification information acquired by the first acquisition means into identification information identifying another broadcast content corresponding to the broadcast content identified by the identification information acquired by the first acquisition means, the search means may search for the broadcast content identified by the identification information given as the result of the conversion performed by the conversion means, the determination means may determine the specific process, corresponding to the process specified by the command information acquired by the first acquisition means, to be actually performed on the broadcast content detected as the result of the search performed by the search means, and the process execution means may execute the specific process determined by the determination means.

The information processing apparatus may further include third acquisition means for acquiring the broadcast content and the identification information, and storage control means for storing the broadcast content acquired by the third acquisition means in a storage unit, wherein the process specified by the command information may be a process associated with a control of the storage control means.

The conversion means may convert, in accordance with the table information, the identification information identifying the specified broadcast content into identification information identifying another broadcast content that corresponds to the originally specified broadcast content and that is different in a compression format from the originally specified broadcast content.

The conversion means may convert, in accordance with the table information, the identification information identifying the specified broadcast content into identification information identifying another broadcast content that corresponds to the originally specified broadcast content and that is different in a broadcasting area from the originally specified broadcast content.

The conversion means may convert, in accordance with the table information, the identification information identifying the specified broadcast content into identification information identifying another broadcast content that corresponds to the originally specified broadcast content and that is different in a compression ratio from the originally specified broadcast content.

The conversion means may convert, in accordance with the table information, the identification information identifying the specified broadcast content into a plurality of pieces of identification information identifying other broadcast contents corresponding to the originally specified broadcast content.

The conversion means may convert, in accordance with the table information, the identification information identifying the specified broadcast content into identification information identifying another broadcast content that corresponds to the originally specified broadcast content and that is different in a broadcast service from the originally specified broadcast content.

The information processing apparatus may further include acceptance means for accepting identification information input by a user and command information input by the user and specifying a process to be performed on a broadcast content identified by the identification information, and supply means for supplying the command information and the identification information to an external apparatus, wherein the conversion means may convert, in accordance with the table information, the identification information accepted by the acceptance means into identification information identifying another broadcast content corresponding to the originally specified broadcast content, and the supply means may supply the command information accepted by the acceptance means to the external apparatus together with the identification information given as a result of the conversion performed by the conversion means.

According to an embodiment of the present invention, there is provided an information processing method including the step of converting identification information identifying a specified broadcast content into identification information identifying another broadcast content corresponding to the originally specified broadcast content, in accordance with table information indicating a correspondence among a plurality of pieces of identification information respectively identifying broadcast contents thereby indicating a correspondence among the broadcast contents.

According to an embodiment of the present invention, there is provided a computer program executable by a computer to perform information processing comprising the step of converting identification information identifying a specified broadcast content into identification information identifying another broadcast content corresponding to the originally specified broadcast content, in accordance with table information indicating a correspondence among a plurality of pieces of identification information respectively identifying broadcast contents thereby indicating a correspondence among the broadcast contents.

According to an embodiment of the present invention, there is provided an information processing system including a first apparatus and a second apparatus, the first apparatus including acceptance means for accepting identification information and command information both input by a user, the identification information identifying a broadcast content, the command information identifying a process to be performed on the broadcast content identified by the identification information, and supply means for supplying the command information and the identification information to the second apparatus, the second apparatus including acquisition means for acquiring the identification information and the command information supplied from the first apparatus, conversion means for converting identification information acquired by the acquisition means into identification information identifying another broadcast content corresponding to the broadcast content identified by the identification information acquired by the acquisition means, in accordance with table information indicating a correspondence among a plurality of pieces of identification information respectively identifying broadcast contents thereby indicating a correspondence among the broadcast contents, and process execution means for executing a process specified by the command information acquired by the acquisition means on the broadcast content identified by the identification information given as a result of the conversion performed by the conversion means.

Thus, in the information processing apparatus, the information processing method, and the information processing program according to one of the embodiments described above, in accordance with table information indicating a correspondence among a plurality of pieces of identification information respectively identifying broadcast contents thereby indicating a correspondence among the broadcast contents, identification information identifying a specified broadcast content is converted into identification information identifying another broadcast content corresponding to the originally specified broadcast content.

In the information processing apparatus, the information processing method, and the information processing program according to one of the embodiments described above, if the first apparatus accepts identification information input by a user and identifying a broadcast content and accepts command information also input by the user and identifying a process to be performed on the broadcast content identified by the identification information, the first apparatus supplies the command information and the identification information to the second apparatus. If the second apparatus receives the command information and the identification information supplied from the first apparatus, then, in accordance with table information indicating a correspondence among a plurality of pieces of identification information respectively identifying broadcast contents thereby indicating a correspondence among the broadcast contents, the second apparatus converts the received identification information into identification information identifying another broadcast content corresponding to the originally specified broadcast content. The second apparatus then performs a process specified by the received command on the broadcast content specified by the converted identification information.

As described above, the present invention makes it possible for a user to easily and properly control the recording operation of a correct program. The conversion of identification information according to the correspondence among identification information identifying contents makes it possible for the user to correctly control the recording operation without concern for differences identification information.

BRIEF DESCRIPTION OF THE DRAWINGS

FIG. 6 is a diagram illustrating an example of a format of an ID conversion table;

FIG. 8 is a diagram illustrating an example of command analysis;

FIG. 12 is a diagram illustrating an example of command analysis;

FIGS. 13A to 13C illustrate examples of ID conversion tables;

DESCRIPTION OF THE PREFERRED EMBODIMENTS

Figure 1:
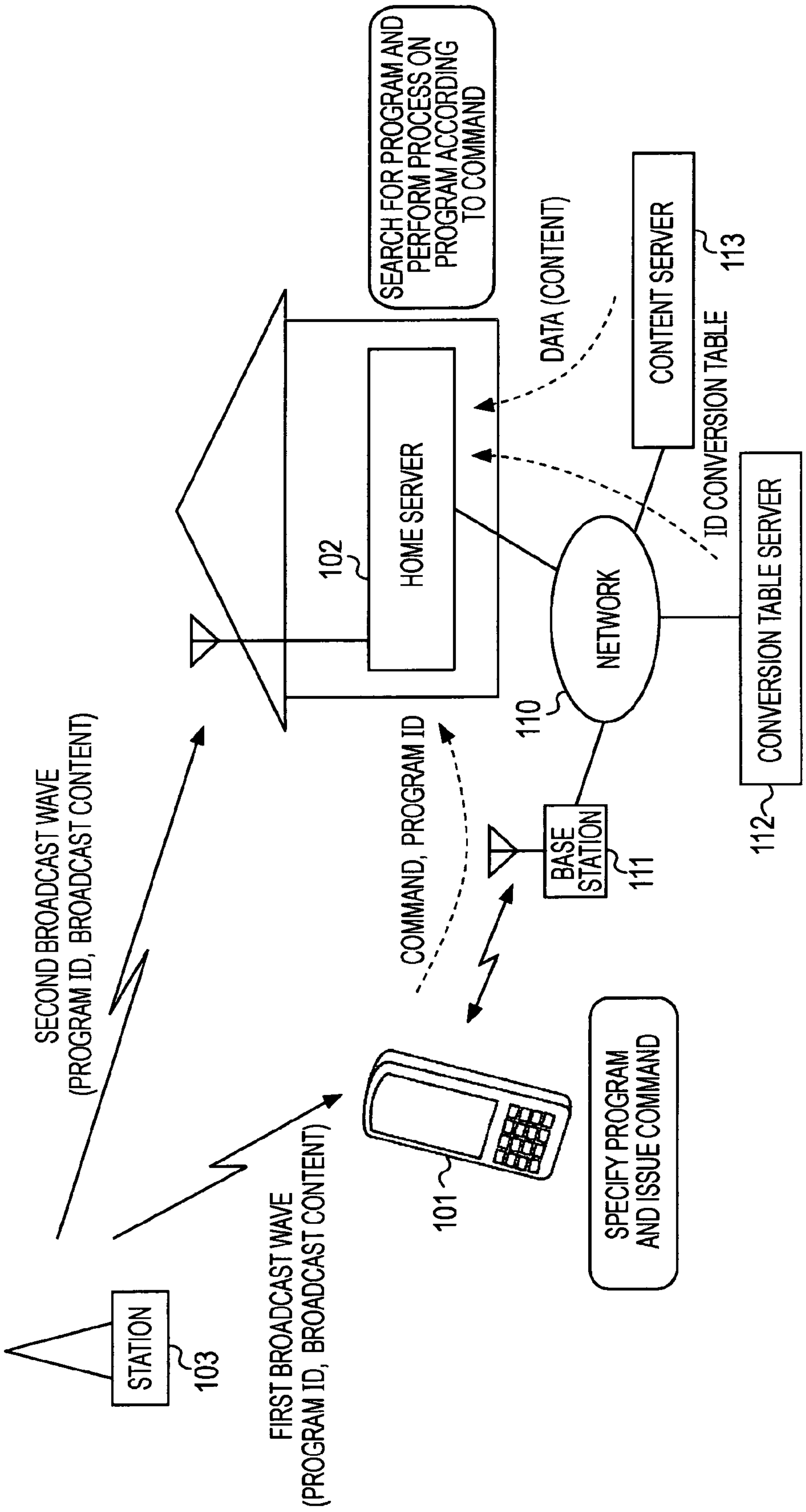
FIG. 1 is a block diagram illustrating an example of a configuration of a content recording system according to an embodiment of the present invention.

Before describing an embodiment of the present invention, the correspondence between the features of the invention and the specific elements disclosed in embodiments of the present invention is discussed below. This description is intended to assure that embodiments supporting the invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the invention, that does not necessarily mean that the element does not relate to other features of the invention.

According to an embodiment of the present invention, there is provided an information processing apparatus (for example, an ID conversion server 512 shown in FIG. 16, a home server 102 shown in FIG. 1, or a portable terminal apparatus 401 shown in FIG. 14) including conversion means (for example, an ID conversion processing unit 522 shown in FIG. 16 or an ID converter 306 shown in FIG. 5) for converting identification information identifying a specified broadcast content into identification information identifying another broadcast content corresponding to the originally specified broadcast content, in accordance with table information (for example, an ID conversion table 321 shown in FIG. 5) indicating a correspondence among a plurality of pieces of identification information (for example, program IDs) respectively identifying broadcast contents thereby indicating a correspondence among the broadcast contents.

The information processing apparatus may further include process execution means (for example, a process execution unit 309 shown in FIG. 5) for executing a specified process on the broadcast content identified by the identification information given as a result of the conversion performed by the conversion means.

The information processing apparatus may further include search means (for example, a program search unit 307 shown in FIG. 5) for searching the broadcast content identified by the identification information given as the result of the conversion performed by the conversion means, and determination means (for example, a command analyzer 308 shown in FIG. 5) for determining a specific process, corresponding to the specified process, to be actually performed on the broadcast content detected as a result of the search performed by the search means, wherein the process execution means may execute the specific process determined by the determination means.

Figure 5:
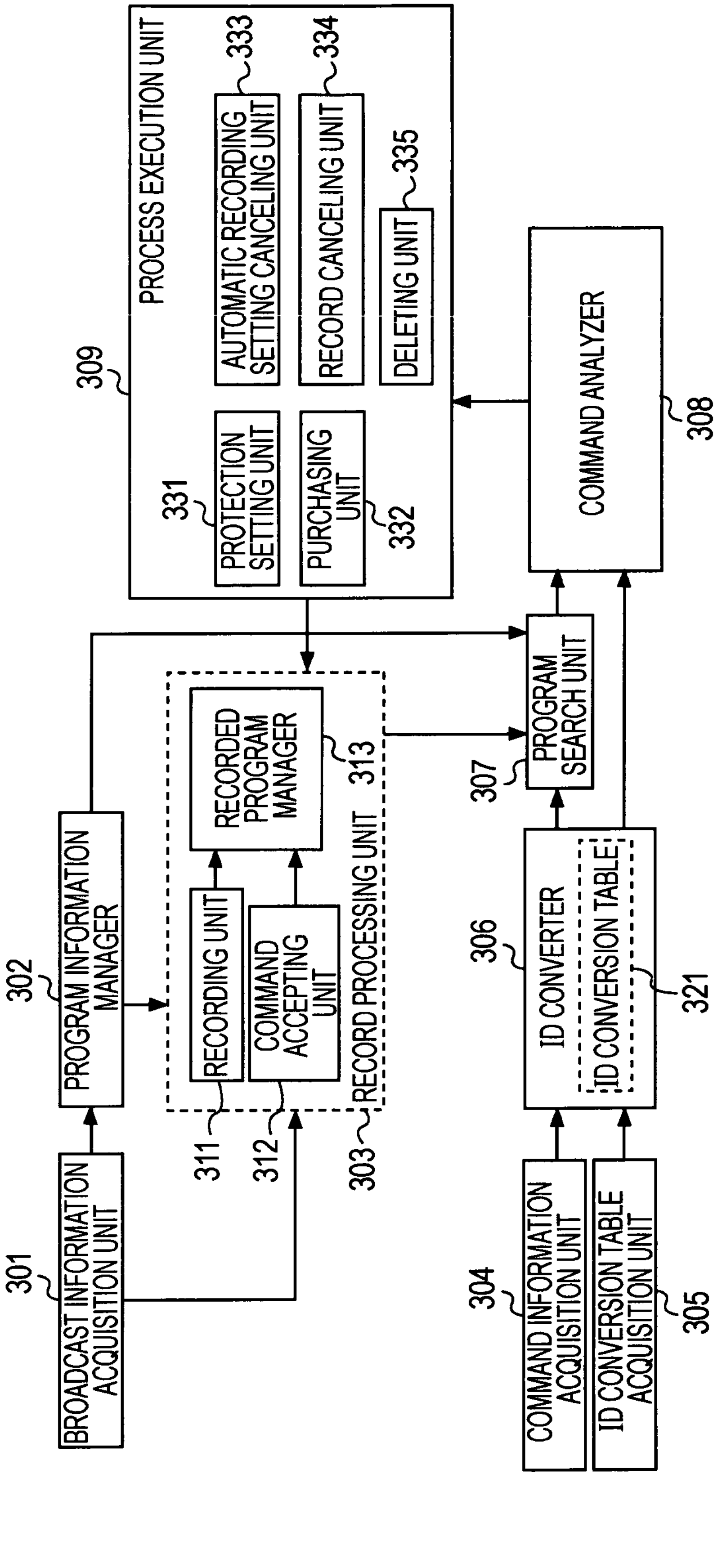
FIG. 5 is a functional block diagram illustrating a recording function of the home server shown in FIG. 3.

The information processing apparatus may further include first acquisition means (for example, a command information acquisition unit 304 shown in FIG. 5) and second acquisition means (for example, an ID conversion table acquisition unit 305 shown in FIG. 5), the first acquisition means being for acquiring identification information and command information both supplied from an external apparatus (for example, a portable terminal apparatus 101 shown in FIG. 1), the command information specifying a process to be performed on a broadcast content identified by the identification information, the second acquisition means being for acquiring the table information from the external apparatus, wherein the conversion means may convert, in accordance with the table information acquired by the second acquisition means, the identification information acquired by the first acquisition means into identification information identifying another broadcast content corresponding to the broadcast content identified by the identification information acquired by the first acquisition means, the search means may search for the broadcast content identified by the identification information given as the result of the conversion performed by the conversion means, the determination means may determine the specific process, corresponding to the process specified by the command information acquired by the first acquisition means, to be actually performed on the broadcast content detected as the result of the search performed by the search means, and the process execution means may execute the specific process determined by the determination means.

The information processing apparatus may further include third acquisition means (for example, a broadcast information acquisition unit 301 shown in FIG. 5) for acquiring the broadcast content and the identification information, and storage control means (for example, a record processing unit 303 shown in FIG. 5) for storing the broadcast content acquired by the third acquisition means in a storage unit (for example, a storage unit 214 shown in FIG. 3), wherein the process specified by the command information may be a process associated with a control of the storage control means.

The information processing apparatus may further include acceptance means (for example, a command accepting unit 254 shown in FIG. 4) for accepting identification information input by a user and command information input by the user and specifying a process to be performed on a broadcast content identified by the identification information, and supply means (for example, a command supply unit 255 shown in FIG. 4) for supplying the command information and the identification information to an external apparatus, wherein the conversion means may convert, in accordance with the table information, the identification information accepted by the acceptance means into identification information identifying another broadcast content corresponding to the originally specified broadcast content, and the supply means may supply the command information accepted by the acceptance means to the external apparatus together with the identification information given as a result of the conversion performed by the conversion means.

Figure 7:
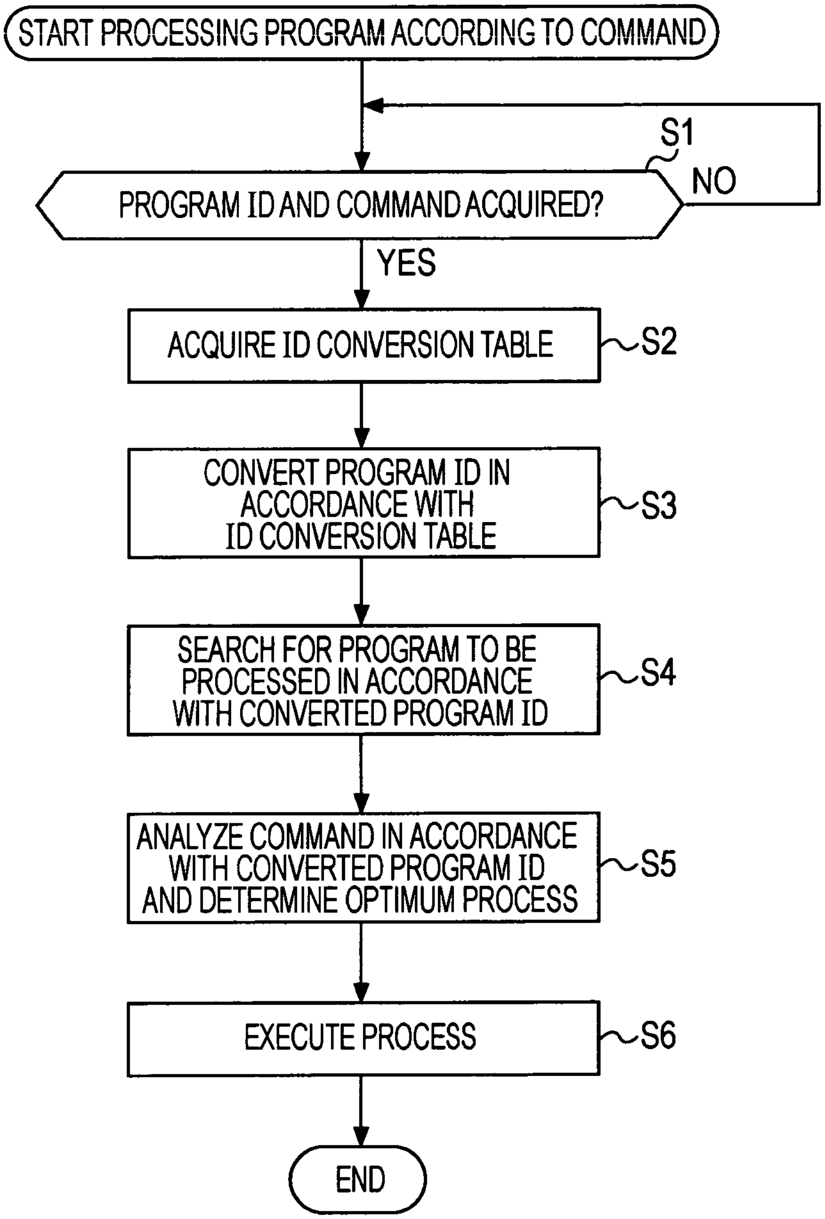
FIG. 7 is a flow chart illustrating an example of a processing flow associated with a process performed according to a given command.

According to an embodiment of the present invention, there is provided an information processing method including the step of, in an information processing apparatus (for example, an ID conversion server 512 shown in FIG. 16, a home server 102 shown in FIG. 1, or a portable terminal apparatus 401 shown in FIG. 14), converting identification information identifying a specified broadcast content into identification information identifying another broadcast content corresponding to the originally specified broadcast content, in accordance with table information indicating a correspondence among a plurality of pieces of identification information respectively identifying broadcast contents thereby indicating a correspondence among the broadcast contents (for example, step S3 in FIG. 7).

According to an embodiment of the present invention, there is provided a computer program executable by a computer to perform information processing comprising the step of converting identification information identifying a specified broadcast content into identification information identifying another broadcast content corresponding to the originally specified broadcast content, in accordance with table information indicating a correspondence among a plurality of pieces of identification information respectively identifying broadcast contents thereby indicating a correspondence among the broadcast contents (for example, step S3 in FIG. 7).

According to an embodiment of the present invention, there is provided an information processing system including a first apparatus (for example, a portable terminal apparatus 101 shown in FIG. 1) and a second apparatus (for example, a home server 102 shown in FIG. 1), the first apparatus including acceptance means (for example, a command accepting unit 254 shown in FIG. 4) for accepting identification information and command information both input by a user, the identification information identifying a broadcast content, the command information identifying a process to be performed on the broadcast content identified by the identification information, and supply means (for example, a command supply unit 255 shown in FIG. 4) for supplying the command information and the identification information to the second apparatus, the second apparatus including acquisition means (for example, an command information acquisition unit 304 shown in FIG. 5) for acquiring the identification information and the command information supplied from the first apparatus, conversion means (for example, an ID converter 306 shown in FIG. 5) for converting identification information acquired by the acquisition means into identification information identifying another broadcast content corresponding to the broadcast content identified by the identification information acquired by the acquisition means, in accordance with table information indicating a correspondence among a plurality of pieces of identification information respectively identifying broadcast contents thereby indicating a correspondence among the broadcast contents, and process execution means (for example, a process execution unit 309 shown in FIG. 5) for executing a process specified by the command information acquired by the acquisition means on the broadcast content identified by the identification information given as a result of the conversion performed by the conversion means.

Now, the present invention is described in further detail below with reference to embodiments.

FIG. 1 illustrates an example of a configuration of a content recording system according to an embodiment of the present invention. The content recording system is adapted to receive a television program content (a broadcast content) broadcast by a broadcast station and record the received television program content. As shown in FIG. 1, the content recording system includes a portable terminal apparatus 101, a home server 102, and broadcast station 103.

The broadcast station 103 is a television program broadcasting facility adapted to broadcast television programs including video and audio contents. The broadcast station 103 transmits television signals (radio wave signals) of television programs via a first broadcast wave or a second broadcast wave.

The broadcast station 103 provides terrestrial digital broadcast services using the first and second broadcast waves. The first broadcast wave is used to broadcast a video/audio content or other data to portable telephone devices or mobile terminal devices, using one segment of a total of 13 segments of a 6 MHz broadcasting band (hereinafter, referred to simply as one-segment broadcasting). The second broadcast wave is used to broadcast a video/audio content or other data to general receiving apparatuses, using the remaining 12 segments of the total of 13 segments of the 6 MHz broadcasting band (hereinafter, referred to simply as full-segment broadcasting). The full-segment broadcast and the one-segment broadcast are similar in that they are both provided as terrestrial digital broadcast service but different in compression format or compression ratio. In general, one-segment broadcasting is transmitted at a lower transmission rate than full-segment broadcasting, so that one-segment broadcasting can be received by simpler receiving devices. As a result, in general, television programs transmitted by one-segment broadcasting are lower in resolution than those transmitted by full-segment broadcasting. In the following explanation, the first broadcast wave and the second broadcast wave are generically denoted as broadcast waves unless it is necessary to distinguish between them.

Each broadcast wave carries television program data (content data) and program information associated with the television program. The program information includes, for example, a description of the television program and information about a broadcast schedule that is provided before television programs are broadcast so that the information can be used as an EPG (Electronic Program Guide) on a receiving apparatus.

When a television program is broadcast, program information including a program ID identifying the television program is also broadcast together with the television program so that the television program can be definitely identified by the program ID. In some cases, program IDs are transmitted several minutes before the start of corresponding television programs.

Programs are explained below. In ordinary television broadcasting, contents (broadcast contents) are produced and broadcast using predetermined broadcast channels and in predetermined hours in accordance with a predetermined schedule. Hereinafter, hours assigned for use to broadcast contents will be referred to simply as broadcast hours, and broadcast contents to be broadcast in assigned broadcast hours will be referred to as television programs or simply as programs.

Television broadcast services are provided in various forms or manners. For example, same broadcast contents (completely same or partially re-edited contents) are broadcast repeatedly in different broadcast hours, that is, some contents are re-broadcast. The television programs are distinguished between an original television program and re-broadcast programs, and program IDs are assigned separately to respective television programs broadcast in different hours.

In many cases, but not always, a television program is broadcast in both full segment and one segment forms according to the same broadcast schedule. Program IDs are assigned so as to distinguish full-segment broadcast programs from one-segment broadcast programs. That is, the program ID is information indicating not the content but the channel and the hour in which the television program is broadcast.

Television programs that are broadcast for the first time are referred to as primary broadcast programs, and those which are re-broadcast are referred to as re-broadcast programs.

In some cases, television programs such as dramas, whose contents are continued from one to another, are sequentially broadcast. Such a set of television programs is referred to simply as a series of television programs. Some television programs that were broadcast in the past are re-edited, for example, into a digest version. Some television programs are broadcast to advertise other television programs that will be broadcast in the future. Such television programs that are related to each other are referred to as related programs.

In FIG. 1, the portable terminal apparatus 101 is a mobile terminal apparatus capable of receiving a first broadcast wave (a one-segment program) transmitted from the broadcast station 103. In accordance with an operation performed by a user, the portable terminal apparatus 101 receives the first broadcast wave transmitted from the broadcast station 103 and outputs an image and a sound/voice in accordance with a television program carried by the received first broadcast wave. The portable terminal apparatus 101 acquires program information associated with one-segment programs included in the first broadcast wave and produces an EPG in accordance with the acquired program information. The produced EPG is stored and presented to a user in response to a command issued by the user.

The home server 102 is capable of receiving a second broadcast wave (full-segment broadcasting) transmitted from the broadcast station 103 and is installed, for example, in a house of a user. The home server 102 receives the full-segment broadcasting and acquires a television program. The acquired television program is sequentially stored in a high-capacity storage medium and retained for a predetermined period (for example, a few weeks). Storing of a broadcast content in a storage medium will be referred to simply as recording of a program. Note that recorded data includes associated audio data.

In response to a request issued by a user, the stored television program is presented to the user via a display (not shown). Because the capacity of the storage medium is finite, there is a possibility that the storage medium becomes full. In such a case, the home server 102 may delete some television programs, which are oldest in time of recording, from the storage medium to produce a free storage space (or the home server 102 may store new television program data by overwriting oldest television program data).

A user is allowed to select a desired one from the stored television programs and play back the selected television program. The home server 102 presents the specified television program to the user via the display (not shown) including a monitor and a speaker so that the user can watch the television program. This makes it possible for the user to watch any television program stored in the home server 102 without having to issue a command to record television programs, at any time within a predetermined period in which television programs are retained in the home server 102 before they are deleted.

In general, there are a plurality of channels on which full-segment programs are broadcast for 24 hours everyday. The home server 102 may record any one or more of the television programs broadcast on the channels. In the following discussion, by way of example, the home server 102 is set to record all receivable programs broadcast on the respective channels.

The home server 102 also acquires program information associated with full-segment programs included in the second broadcast wave and produces an EPG according to the acquired program information. The produced EPG is stored and presented to a user in response to a command issued by the user.

In addition to the capability of receiving one-segment programs, the portable terminal apparatus 101 also has a wireless communication capability that allows a connection to a network 110 such as a public telephone network or the Internet via a base station 111 thereby communicating with other communication apparatuses.

The network 110 is a network such as a public telephone network, the Internet, a WAN (Wide Area Network) or a LAN (Local Area Network), which may be of a wireless or wire transmission network and which may be formed by a single network or a combination of a plurality of networks.

The home server 102 also has a communication capability that allows a connection to the network 110. Thus, the portable terminal apparatus 101 is capable of communicating with the home server 102 via the network 110. If the portable terminal apparatus 101 receives a command to record or delete a program from a user, the portable terminal apparatus 101 supplies the command and a program ID identifying the specified program to the home server 102 via the network 110. If the home server 102 receives the command and the associated program ID, the home server 102 performs the specified process, such as recording or deleting, on the television program identified by the program ID.

The network 110 is also connected to a conversion table server 112 and a content server 113. In accordance with a request issued by the home server 102, the conversion table server 112 provides an ID conversion table indicating, in the form of correspondence among program IDs, the correspondence between programs (one-segment programs) broadcast by the first broadcast wave and programs (full-segment programs) broadcast by the second broadcast wave, to the home server 102 via the network 110.

As will be described in further detail below, the ID conversion table may be produced or acquired in an arbitrary manner. For example, it may be produced in accordance with information supplied from the broadcast station 103. Alternatively, the ID conversion table may be produced according to a rule established by a manager or an operator of the conversion table server 112. Still alternatively, the ID conversion table may be supplied from the broadcast station 103. In the following explanation, by way of example, it is assumed that the ID conversion table is produced to indicate the correspondence among television programs in accordance with information provided by the broadcast station 103.

The content server 113 is adapted to provide requested contents (programs) to the home server 102 via the network 110.

When a user is in his/her house, the user can watch a one-segment television program using the portable terminal apparatus 101 and can watch a full-segment television program being currently broadcast using the home server 102. The user is also allowed to watch a television program which was broadcast as a full-segment program in the past and which is stored in the home server 102. If the user likes a program being played back, the user is allowed to operate the home server 102 to set the program data to be permanently stored in the home server 102. If the user does not like a program, the user is allowed to cancel the setting in terms of permanent storage for the program data or delete the program data.

However, at a location other than user's home, the user cannot directly operate the home server 102 installed in his/her home, although the user is allowed to watch a one-segment television program on the portable terminal apparatus 101.

In such a state, if the user wants to perform a process such as recording or deleting on a one-segment television program being watched via the portable terminal apparatus 101 or other programs whose information is included in an EPG displayed on the portable terminal apparatus 101, the user issues an operation command via the portable terminal apparatus 101.

The portable terminal apparatus 101 accepts the operation command and supplies a command corresponding to the input operation command together with the program ID identifying the specified program to the home server 102 via the network 110. Note that the program ID supplied in this situation identifies a one-segment television program but does not identity a program included in an EPG acquired by the home server 102 or a program stored in the home server 102. If the home server 102 receives the command and the program ID, the home server 102 accesses the conversion table server 112 to acquire an ID conversion table indicating the correspondence associated with the supplied program ID. In accordance with the ID conversion table, the home server 102 determines a program ID identifying a full-segment program corresponding to the one-segment program identified by the supplied program ID.

On the television program data identified by the determined program ID, the home server 102 performs the process corresponding to the command supplied from the portable terminal apparatus 101. The process performed by the home server 102 may include setting the timer-controlled recording operation so as to record a television program that will be broadcast in the future, canceling a recording operation being currently performed, protecting specified television program data, canceling protection for specified television program data, and deleting specified television program data. In a case where the home server 102 receives a command to record a television program that is the same in content as a program that has already been deleted, the home server 102 sets the timer-controlled recording operation so as to record the program that will be re-broadcast in the future or the home server 102 purchases the program data from the content server 113.

That is, if the user operates the portable terminal apparatus 101 to issue a command to perform a particular process on a one-segment program, the home server 102 performs a process corresponding to the command on a full-segment program corresponding to the one-segment program specified by the user.

The above-described capability of the home server 102 to properly convert the program ID in accordance with the ID conversion table allows the user to easily issue a command in terms of recording, deleting, or other processing without concern for differences in program IDs (or broadcast hours), as will be explained in further detail later. The user is also allowed to issue a command to make a complicated setting such as recording of a series of programs simply by specifying a single program, as will be explained in further detail later.

The portable terminal apparatus 101 may be any mobile terminal apparatus such as a portable telephone device, a PDA (Personal Digital Assistants) device, a notebook personal computer, a portable television receiver, a portable game machine, or a car navigation system terminal, as long as the terminal apparatus has the above-described capability.

The home server 102 may be any apparatus such as a personal computer, a hard disk recorder/player, or a DVD recorder/player, as long as it has the above-described capability. Note that there is no particular restriction on the location where the home server 102 is installed.

There is also no particular restriction on broadcast contents. For example, the broadcast program may be a television broadcast program or a radio broadcast program. The broadcast station 103 is a facility configured to transmit a broadcast wave. Note that the broadcast station 103 does not denote a particular single broadcast state but generically denotes various stations. That is, the broadcast station 103 may be configured in various forms and may be a combination of a plurality of various types of broadcast stations including a radio tower.

The broadcast station 103 may provide broadcast services in arbitrary forms. For example, the service may be a terrestrial digital broadcast service, a terrestrial analog broadcast service, a satellite broadcast service using a BS (Broadcasting Satellite) or a CS (Communication Satellite), a cable television (CATV) service, a television broadcast service using the Internet, or other broadcast services. The broadcast station 103 may provide a plurality of types of broadcast services. In such a case, the first broadcast wave and the second broadcast wave may carry broadcast signals other than one-segment or full-segment broadcast signals, wherein the first broadcast wave is received by the portable terminal apparatus 101 and the second broadcast wave is received by the home server 102. That is, there is no particular restriction on the relationship between the first broadcast wave and the second broadcast wave. The first broadcast wave and the second broadcast wave may be broadcast signals associated with different or same broadcast services. The first broadcast wave and the second broadcast wave may be completely same broadcast signals.

The broadcast station 103 may transmit broadcast contents in an arbitrary manner. For example, contents may be transmitted using a wireless signal or may be transmitted via a cable. For example, in the case of CATV or television broadcasting using the Internet, a broadcast wave is transmitted via a cable network.

The portable terminal apparatus 101 and the home server 102 may be configured as follows.

Figure 2:
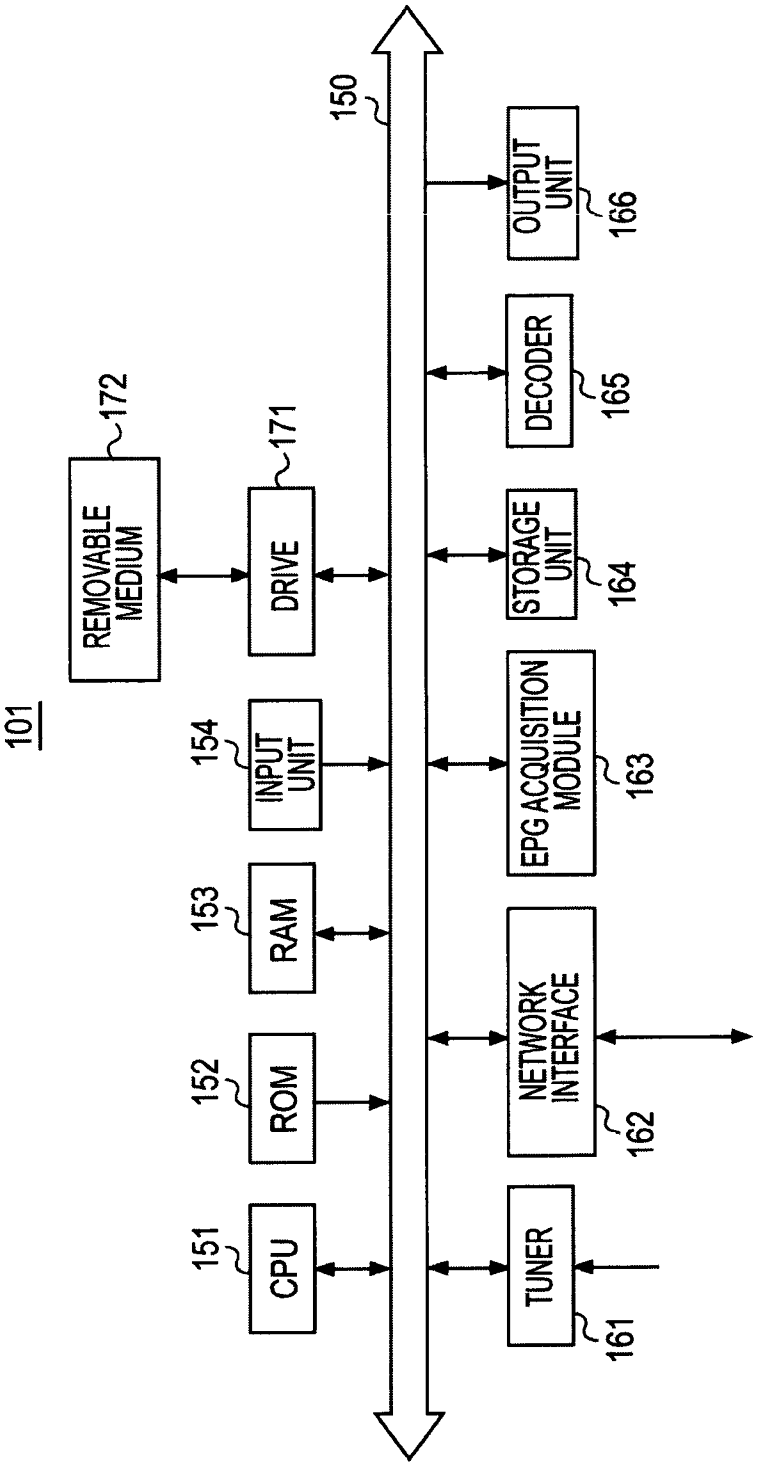
FIG. 2 is a block diagram illustrating an example of an internal configuration of a portable terminal apparatus shown in FIG. 1.

FIG. 2 is a block diagram illustrating an example of an internal configuration of the portable terminal apparatus 101 shown in FIG. 1.

In the portable terminal apparatus 101, a CPU (Central Processing Unit) 151 executes various kinds of processing in accordance with a program stored in a ROM (Read Only Memory) 152 or a program loaded in a RAM (Random Access Memory) 153 from a storage unit 164. The RAM 153 is also used to store various data as required during processes performed by the CPU 151.

The CPU 151, the ROM 152, and the RAM 153 are connected to each other via a bus 150. The bus 150 is also connected to an input unit 154. The input unit 154 includes an input device such as a keyboard and/or a mouse used by a user to input a command or data, and also includes an input terminal or the like adapted to input control information and/or data supplied from another apparatus.

The bus 150 is also connected to a tuner 161, a network interface 162, an EPG acquisition module 163, a storage unit 164, a decoder 165, and an output unit 166.

The tuner 161 operates under the control of the CPU 151 to select a receiving channel, receive a first broadcast wave transmitted on the selected channel, supply data (digital data) of program information included in the first broadcast wave to the EPG acquisition module 163, and supply data (encoded digital data) of a television program extracted from the first broadcast wave to the decoder 165.

The network interface 162 is an interface via which to transmit/receive control information and/or data to/from an external communication apparatus via the network 110. More specifically, under the control of the CPU 151, the network interface 162 acquires data of program information (or an electronic program table) via the network 110 and supplies the acquired data to the EPG acquisition module 163, and the network interface 162 converts data such as a program ID or a command supplied via the bus 150 into the form of packets and supplies the resultant packets to the home server 102 via the network 110.

The EPG acquisition module 163 operates under the control of the CPU 151 to produce an EPG on the basis of program information associated with programs transmitted by first broadcast waves supplied via the tuner 161 or the network interface 162, and supply the produced EPG to the storage unit 164 or the RAM 153 to store it therein.

The storage unit 164 includes a non-volatile storage medium such as a flash memory or the like and is adapted to store a program or data supplied via the bus 150 and supply data stored therein to another processing unit.

The decoder 165 operates under the control of the CPU 151 to decode a content (encoded data) supplied via the bus 105 and supply the resultant decoded data to the output unit 166. The output unit 166 includes an output device such as a monitor and a speaker and an output terminal adapted to supply data and control information to another apparatus. The decoder 165 operates under the control of the CPU 151 to display an image on the monitor and/or output a voice/sound from the speaker in accordance with data of a content supplied via the bus 150 or supply data to an external apparatus. In addition to content data, the output unit 166 also outputs other data under the control of the CPU 151.

The bus 150 is also connected to a drive 171 as required. A removable storage medium 172 such as a magnetic disk, an optical disk, a magnetooptical disk, or a semiconductor memory is mounted on the drive 171 as required, and a computer program is read from the mounted removable storage medium 172 and installed into the storage unit 164, as required. Under the control of the CPU 151, the drive 171 writes a program or data (including content data) supplied via the bus 150 into the removable medium 172.

In a case where a received broadcast content is not in the form of coded data, the apparatus may include an encoder for encoding the received content data into a form that can be handled by the decoder 165.

Figure 3:
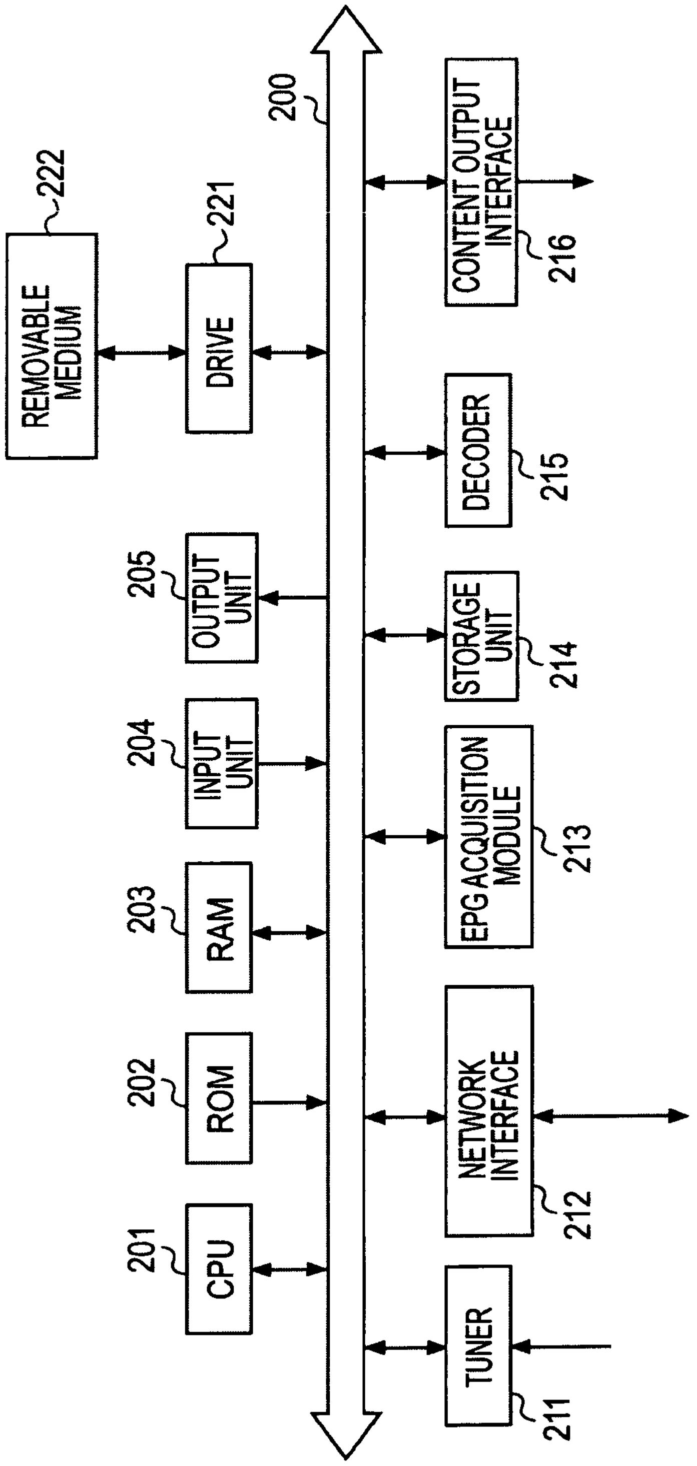
FIG. 3 is a block diagram illustrating an example of an internal configuration of a home server shown in FIG. 1.

FIG. 3 is a block diagram illustrating an example of an internal configuration of the home server 102 shown in FIG. 1.

The home server 102 is basically similar in configuration to the portable terminal apparatus 101 and includes various parts connected to each other via a bus 200. They are a CPU 201, a ROM 202, a RAM 203, an input unit 204, an output unit 205, a tuner 211, a network interface 212, an EPG acquisition module 213, a storage unit 214, a decoder 215, a drive 221, and a content output interface 216.

The bus 200 is for connecting the various parts described above to each other, and is similar to the bus 150 in the portable terminal apparatus 101. The CPU 201, the ROM 202, and the RAM 203 are similar to the CPU 151, the ROM 152, and the RAM 153 in the portable terminal apparatus 101. The CPU 201 executes various processes in accordance with a program stored in the ROM 202 or a program loaded from the storage unit 214 into the RAM 203. The RAM 203 is also used to store data used by the CPU 201 in the execution of various processes.

The input unit 204 corresponds to the input unit 154 of the portable terminal apparatus 101 and includes an input device such as a keyboard and/or a mouse used by a user to input a command or data, and also includes an input terminal or the like adapted to input control information and/or data supplied from another apparatus. The output unit 205 corresponds to the output unit 166 of the portable terminal apparatus 101 and includes an output terminal via which to output data supplied via the bus 150 to an external apparatus.

The tuner 211 corresponds to the tuner 161 of the portable terminal apparatus 101, however the tuner 211 is different from the tuner 161 in that it operates under the control of the CPU 201 to select a receiving channel and receive a second broadcast wave transmitted on the selected channel. The tuner 211 extracts data (digital data) of program information from the second broadcast wave and supplies the extracted data to the EPG acquisition module 213. The tuner 211 extracts data (encoded digital data) of a television program from the second broadcast wave and supplies the extracted data to the storage unit 214 to store it therein or to the decoder 215 to decode it.

The network interface 212 corresponds to the network interface 162 of the portable terminal apparatus 101 and is configured to transmit/receive data and control information to/from another apparatus via the network 110. More specifically, the network interface 212 is connected to the bus 200 and operates under the control of the CPU 201 to acquire data of program information via the network 110 and supply the acquired data to the EPG acquisition module 213 via the bus 200. If the network interface 212 acquires a program ID and a command from the portable terminal apparatus 101 via the network 110, the network interface 212 supplies the acquired program ID and the command to the CPU 201. Furthermore, the network interface 212 communicates with the conversion table server 112 or the content server 113 via the network 110 to acquire an ID conversion table or a content, and supplies the acquired ID conversion table or the content to the CPU 201, the RAM 203, the storage unit 214, or the decoder 215 via the bus 200.

The EPG acquisition module 213 corresponds to the EPG acquisition module 163 of the portable terminal apparatus 101 and is configured to operate under the control of the CPU 201 to produce an EPG on the basis of program information associated with programs transmitted by second broadcast waves supplied via the tuner 211 or the network interface 212 and supply the produced EPG to the storage unit 214 or the RAM 203 to store it therein.

The storage unit 214 includes a high-capacity storage medium such as a hard disk and is adapted to store a program or data supplied via the bus 200 and supply data or the program stored therein to another processing unit. More specifically, the storage unit 214 stores a television program received via the tuner 211 and retains it for a predetermined period (for example, a few weeks). The stored television program data is deleted (overwritten by new data) when the predetermined period of time has elapsed, unless the data is protected. The storage unit 214 also operates under the control of the CPU 201 to supply data of a television program specified by a user to the decoder 215. In addition to television program data, the storage unit 214 is also used to store EPG information acquired via the EPG acquisition module 213, a program executed by the CPU 201, or various data used in execution of the program.

The decoder 215 corresponds to the decoder 165 of the portable terminal apparatus 101 and is configured to operate under the control of the CPU 201 to decode television program data (coded data) supplied via the bus 200 and supply the resultant decoded data to the content output interface 216. The content output interface 216 also operates, under the control of the CPU 201, to supply television program data supplied from the decoder 215 to the display (not shown) to display an image and output a sound/voice.

The drive 221 corresponds to the drive 171 of the portable terminal apparatus 101. A removable storage medium 222 such as a magnetic disk, an optical disk, a magnetooptical disk, or a semiconductor memory is mounted on the drive 221 as required, and a computer program is read from the mounted removable storage medium 222 and installed into the storage unit 214, as required. Under the control of the CPU 201, the drive 221 writes a program or data (including content data) supplied via the bus 200 in the removable medium 222.

Next, various functions of the portable terminal apparatus 101 and the home server 102 are described below.

Figure 4:
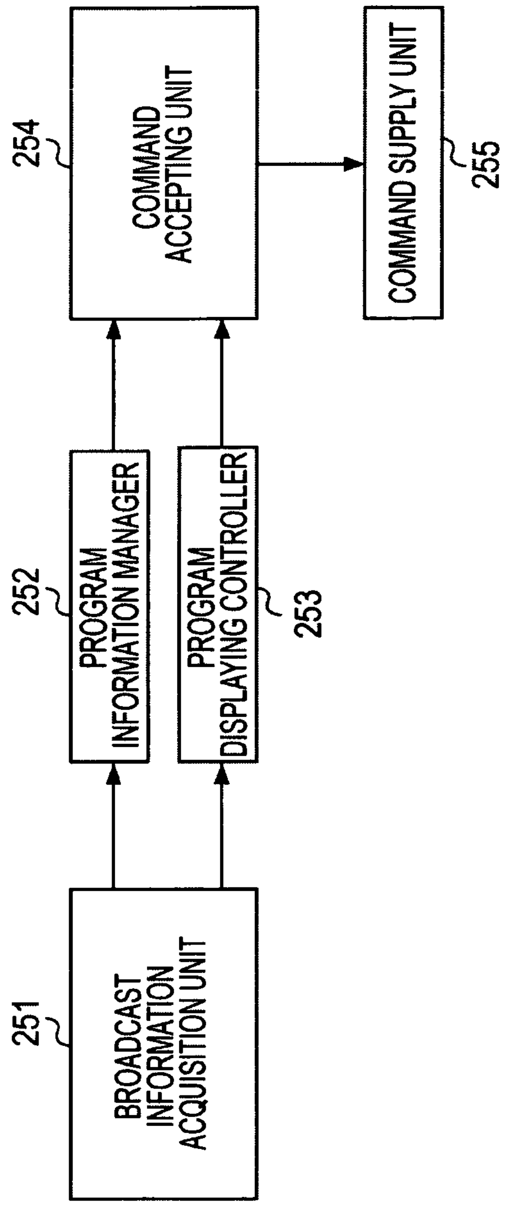
FIG. 4 is a functional block diagram illustrating a recording function of the portable terminal apparatus shown in FIG. 2.

FIG. 4 is a diagram illustrating functional blocks, in terms of the recording function, of the portable terminal apparatus 101.

The functional blocks of the portable terminal apparatus 101 include a broadcast information acquisition unit 251, a program information manager 252, a program displaying controller 253, a command accepting unit 254, and a command supply unit 255.

The broadcast information acquisition unit 251 controls the tuner 161 to receive a first broadcast wave and acquires broadcast information including a television program and program information. The program information manager 252 controls the EPG acquisition module 163 to produce an EPG on the basis of the program information acquired by the broadcast information acquisition unit 251, stores the EPG in the storage unit 164, and manages it. The program displaying controller 253 controls the decoder 165 and the output unit 166 to display the television program acquired by the broadcast information acquisition unit 251 on the monitor.

The command accepting unit 254 controls the output unit 166 to display, on the monitor, a GUI screen for accepting a command issued by a user. The command accepting unit 254 also controls the input unit 154 to accept a command input by the user, on the basis of the GUI screen, in terms of storing a television program (a one-segment program) broadcast on the first broadcast wave.

The command supply unit 255 controls the network interface 162 to supply the command input by the user and accepted by the command accepting unit 254, together with associated information including a program ID identifying a program to be processed according to the command, to the home server.

FIG. 5 is a diagram illustrating functional blocks, in terms of the recording function, of the home server 102.

The functional blocks of the home server 102 include a broadcast information acquisition unit 301, a program information manager 302, a record processing unit 303, a command information acquisition unit 304, an ID conversion table acquisition unit 305, an ID converter 306, a program search unit 307, a command analyzer 308, and a process execution unit 309.

The broadcast information acquisition unit 301 controls the tuner 211 to receive a first broadcast wave and acquires broadcast information including a television program and program information. The program information manager 302 controls the EPG acquisition module 213 to produce an EPG on the basis of the program information acquired by the broadcast information acquisition unit 301, stores the EPG in the storage unit 214, and manages it.

The record processing unit 303 controls the storage unit 214 to perform processing associated with recording of the television program acquired by the broadcast information acquisition unit 301. The record processing unit 303 includes a recording unit 311, a command accepting unit 312, and a recorded program manager 313.

The recording unit 311 stores the television program acquired by the broadcast information acquisition unit 301 in the storage unit 214. The command accepting unit 312 controls the input unit 204 to accept a command issued by a user in terms of recording, deleting, or protecting television program data. The recorded program manager 313 manages the recorded television programs, which have been stored in the storage unit 214 via the recording process performed by the recording unit 311. More specifically, in accordance with a command issued by a user and accepted by the command accepting unit 312, the recorded program manager 313 sets or cancels the protection for a specified television program data stored in the storage unit 214, or deletes specified data from the storage unit 214.

The command information acquisition unit 304 acquires command information (a command and a program ID) supplied from the portable terminal apparatus 101 via the network interface 212. The ID conversion table acquisition unit 305 supplies the program ID acquired by the command information acquisition unit 304 to the conversion table server 112 via the network interface 212, and requests the conversion table server 112 to provide an ID conversion table indicating the correspondence between this program ID and a program ID identifying a corresponding television programs of a second broadcast wave.

In accordance with the ID conversion table 321 acquired via the process performed by the ID conversion table acquisition unit 305, the ID converter 306 converts the program ID of the first broadcast wave acquired via the process performed by the command information acquisition unit 304 into the program ID of the second broadcast wave corresponding to the original program ID.

FIG. 6 illustrates an example of a format of the ID conversion table stored in the conversion table server 112. As shown in FIG. 6, the ID conversion table 321 has a field in which a first broadcast wave program ID is described and a filed in which a second broadcast wave program ID is described, whereby a combination of each first broadcast wave program ID and a corresponding second broadcast wave program ID is described. In response to a request from the home server 102, the conversion table server 112.provides a part or all of information described in the ID conversion table 321. There is no particular restriction on which part of the ID conversion table 321 should be provided by the conversion table server 112, as long as the provided information includes all necessary information.

For example, when the home server 102 receives a program ID from the portable terminal apparatus 101 and issues a request for an ID conversion table, it is sufficient to provide only a part, extracted from the ID conversion table 321, indicating the correspondence associated with the program ID supplied from the portable terminal apparatus 101 to the home server 102. This leads to a reduction in the amount of data to be transmitted, and thus this allows the conversion table server 112 to quickly provide the ID conversion table 321. The conversion table server 112 may provide only second broadcast wave program ID corresponding to the original program ID. This allows a further reduction in the amount of data to be transmitted, and thus the conversion table server 112 can more quickly provide the information.

In some cases, it is desirable that the conversion table server 112 provide the whole ID conversion table 321 or a large part thereof at a time, as in the case where the home server 102 acquires the ID conversion table 321 in advance of receiving program IDs from the portable terminal apparatus 101.

Referring again to FIG. 5, the program search unit 307 searches for a program corresponding to the converted program ID thereby to determine a television program to be processed. The command analyzer 308 analyzes the command acquired by the command information acquisition unit 304 in accordance with the television program determined, by the program search unit 307, to be processed, thereby determining the process to be performed on the television program.

The process execution unit 309 performs the process determined via the analysis performed by the command analyzer 308. The process execution unit 309 includes a protection setting unit 331, a purchasing unit 332, an automatic recording setting canceling unit 333, a record canceling unit 334, and a deleting unit 335.

The protection setting unit 331 controls the record processing unit 303 to set a protection status into a protected state (permanent stored state) for specified television program data which is stored in the storage unit 214 and which is managed by the recorded program manager 313. The purchasing unit 332 controls the network interface 212 to access the content server 113 to purchase a specified television program thereby acquiring it. The acquired television program data is stored in the storage unit 214 and the status thereof is set into the protected state (permanent stored state).

The automatic recording setting canceling unit 333 controls the record processing unit 303 to cancel the setting of an automatic recording operation for a specified television program that will be broadcast in the future and that is currently programmed to be recorded by the recording unit 311, so that this television program will not recorded. The record canceling unit 334 controls the record processing unit 303 to stop the recording operation being currently performed. The record canceling unit 334 also controls the record processing unit 303 to delete this television program data that has already been stored. The deleting unit 335 controls the record processing unit 303 to delete television program data existing in the storage unit 214 to create a free storage space.

If the home server 102 receives the program ID and the command from the portable terminal apparatus 101, the home server 102 performs a process specified by the received command on the program according to the received program ID, as described below with reference to a flow chart shown in FIG. 7.

In step S1, the command information acquisition unit 304 shown in FIG. 5 determines whether a command and an associated program ID have been acquired. This step is performed repeatedly until it is determined that a command and an associated program ID have been acquired. If a command and an associated program ID have been received from the portable terminal apparatus 101, the processing flow proceeds to step S2. If the command and the associated program ID have been acquired by the command information acquisition unit 304, then, in step S2, the ID conversion table acquisition unit 305 acquires the ID conversion table 321 (including at least table information indicating a program ID corresponding to the original program ID supplied from the portable terminal apparatus 101) from the conversion table server 112.

In step S3, in accordance with the ID conversion table 321 acquired by the ID conversion table acquisition unit 305, the ID converter 306 converts the program ID supplied from the portable terminal apparatus 101 into a program ID identifying a corresponding television program broadcast in the full-segment format.

In step S4, in accordance with the converted program ID, the program search unit 307 searches for a television program to be processed from television programs described in an EPG or those which have already been stored. In step S5, the command analyzer 308 analyzes the command supplied from the portable terminal apparatus 101 in accordance with the television program detected in the search according to the converted program ID, and the command analyzer 308 determines a process to be performed on the television program.

There is a possibility that the process to be performed is different depending on the television program, even when the same command is given. Taking this into account, the command analyzer 308 determines the correct process to be performed.

In step S6, the process execution unit 309 performs the process, such as protection setting, deleting, etc., determined by the command analyzer 308. If step S6 is completed, the process according to the command is ended.

FIG. 8 illustrates an example of an analysis pattern performed by the command analyzer 308.

A user is allowed to operate the portable terminal apparatus 101 to specify a television program being viewed on the portable terminal apparatus 101 or a particular television program included in an EPG and issue a command to request the home server 102 to perform a particular process, such as protection setting, deleting, etc., on the specified television program. The command and the program ID issued and specified by the user are transmitted from the portable terminal apparatus 101 to the home server 102.

Although there is no particular restriction on commands, it is assumed, for simplicity and ease of explanation, that there are two commands: a protect command and a delete command. That is, if a user specifies a particular television program to be stored, the protection command is issued, while if the user specified a particular television program to be deleted, the delete command is issued.

A television program to be processed is selected by a user from television programs included in an EPG or a television program being currently viewed. Therefore, there is a possibility that a plurality of television programs, which are related to the one-segment television program selected by the user and which may include television programs that were broadcast in the past, a program that is currently being broadcast, television programs that are scheduled to be broadcast in the future, are specified as programs to be processed. Furthermore, there is a possibility that there is a difference in schedule between one-segment broadcasting and full-segment broadcasting. Even in the case where there is no difference in broadcasting schedule, there is still a possibility that a slight difference in broadcast timing can occur between one-segment broadcasting and full-segment broadcasting.

That is, any one of full-segment programs including television programs broadcast in the past, television programs being currently broadcast, and television programs that will be broadcast in the future can be specified by a user as a program to be processed.

In a case where a series of television programs such as a series of drama programs is specified by a user, a plurality of television programs included in the specified series should be processed.

In view of the above, as shown in FIG. 8, the command analyzer 308 performs the analysis as follows. First, the command analyzer 308 determines whether the given command is the protect command or the delete command. The command analyzer 308 then determines whether the specified television program is one that was broadcast in the past (a past television program), one that is being currently broadcast (a present television program), one that will be broadcast in the future (a future television program), or a combination of past, current, and future television programs (a series of television programs), and the command analyzer 308 determines the process to be processed, depending on the specified television program.

For example, in the case where the given command is the "protect" command, and the specified television program is a "past" program, that is, if it is instructed to retain data of a full-segment program that was broadcast in the past, then the command analyzer 308 determines that the process to be performed is to set a data protection flag in management information associated with the data of the specified program stored in the storage unit 214 as shown in a first row of the table of FIG. 8 to protect this data so that this data will be retained without being deleted at and after the expiration of the predetermined standard storage period.

In a case where a program that has already been deleted by the home server 102 is specified as a program to be processed, the command analyzer 308 may determine that the process to be performed is to purchase the data of the specified program from the content server 113.

In a case where the given command is the "protect" command and a specified program is a "present" program, that is, if it is instructed to store data of a full-segment program being currently broadcast, then the command analyzer 308 determines that the process to be performed is to set the data protection flag in the management information associated with the data of the specified program stored in the storage unit 214, as shown in a second row in the table of FIG. 8.

In a case where the given command is the "protect" command and a specified program is a "future" program, that is, if it is instructed to store data of a full-segment program that will be broadcast in the future, then the command analyzer 308 determines that the process to be performed is to create management information in advance and set the data protection flag in the created management information, as shown in a third row in the table of FIG. 8.

In a case where the given command is the "protect" command and a specified program is a "series" of programs, that is, if it is instructed to store data of a plurality of programs, then the command analyzer 308 determines whether a program is one that was broadcast in the past, one that is currently being broadcast, or one that will be broadcast in the future, separately for each of the programs included in the specified series, and, in accordance with the determination result, the command analyzer 308 determines the process to be performed for each program, as shown in a fourth row in the table of FIG. 8.

In a case where the given command is the "delete" command and a specified program is a "past" program, that is, if it is instructed to delete data of a full-segment program that was broadcast in the past, then the command analyzer 308 determines that the process to be performed is to delete the data of the specified program from the storage unit 214, as shown in a fifth row in the table of FIG. 8. Instead of deleting the data, the protection for the data may be cancelled.

In a case where the given command is the "delete" command and a specified program is a "present" program, that is, if it is instructed to delete data of a full-segment program that is currently being broadcast, then the command analyzer 308 determines that the process to be performed is to stop the recording operation and delete the data of the program that has already been stored, as shown in a sixth row in the table of FIG. 8.

In a case where the given command is the "delete" command and a specified program is a "future" program, that is, if it is instructed to delete data of a full-segment program that will be broadcast in the future, then the command analyzer 308 determines that the process to be performed is to set the automatic recording operation such that the specified program will not be recorded, as shown in a seventh row in the table of FIG. 8.

In a case where the given command is the "delete" command and a "series" of programs is specified, that is, if it is instructed to delete data of a plurality of programs, then the command analyzer 308 makes a determination as to whether corresponding full-segment programs were broadcast in the past or are currently being broadcast or will be broadcast in the future, separately for each of the programs belong to the specified series, and, in accordance with the determination result, the command analyzer 308 determines the process to be performed for each program, as shown in an eighth row in the table of FIG. 8.

Note that processes performed are not limited to the examples described above, but other processes may be performed. Also note that commands are not limited to the examples described above, but other commands may be allowed.

Figure 9:
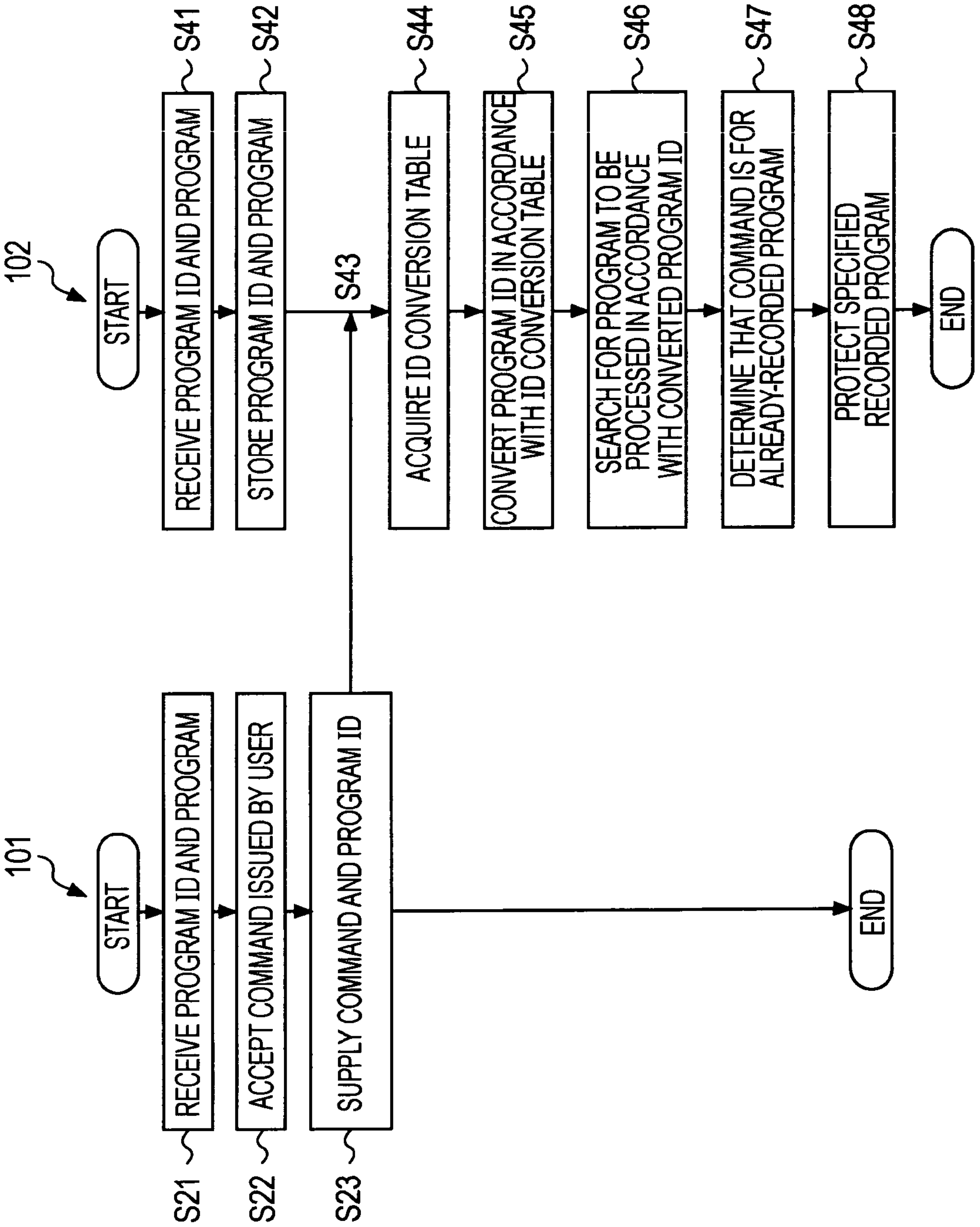
FIG. 9 is a flow chart illustrating an example of a processing flow associated with a total operation performed in a system in accordance with an operation command.

A specific example of a process of supplying a command and an associated process is described below with reference to a flow chart shown in FIG. 9. In the following explanation, by way of example, it is assumed that a full-segment television program corresponding to a one-segment television program being currently viewed by a user has already been recorded on the home server 102.

In step S21, in accordance with a command issued by a user, the portable terminal apparatus 101 receives a one-segment program and a program ID thereof. In step S41, the home server 102 receives a full-segment program and a program ID thereof corresponding to the one-segment program being received on the portable terminal apparatus 101. In step S42, the home server 102 stores the received program ID and the received program data.

Figure 10:
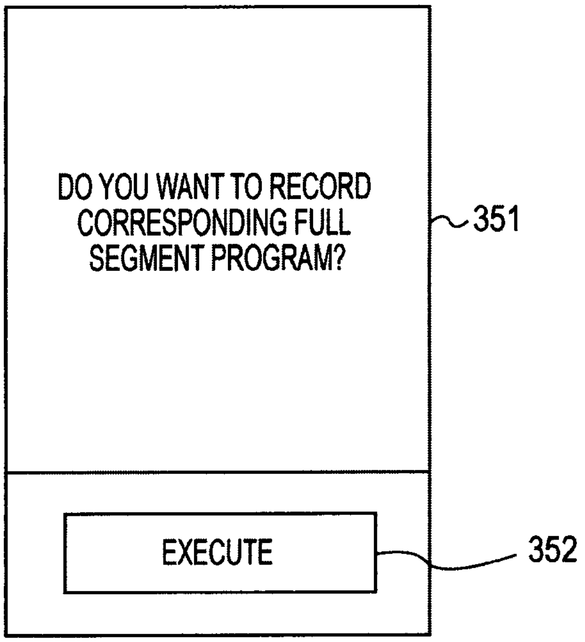
FIG. 10 is a diagram illustrating an example of a confirmation screen.

In step S22, if the portable terminal apparatus 101 is operated by the user viewing the program, the portable terminal apparatus 101 accepts a command corresponding to the operation performed by the user. For example, if the user performs an operation to issue a record command when a particular program is being viewed, then a confirmation GUI screen 351 such as that shown in FIG. 10 is displayed. If the user wants to record the program, the user clicks an EXECUTE button 352 on the confirmation GUI screen 351.

In step S23, in accordance with the command input by the user, the portable terminal apparatus 101 transmits the program ID and a command corresponding to the input command to the home server 102.

In step S43, the home server 102 receives the command and the program ID. In step S44, the home server 102 acquires an ID conversion table from the conversion table server 112. In step S45, in accordance with the acquired ID conversion table, the home server 102 converts the program ID. In step S46, in accordance with the converted program ID, the home server 102 searches for a program to be processed. In step S47, the home server 102 determines that the given command is a record command for a program that has already been recorded. In step S48, the home server 102 sets the protection status such that the specified program is protected.

As described above, the home server 102 converts a program ID of a first broadcast wave into a corresponding program ID of a second broadcast wave, and performs a specified process such as recording or deleting on a program identified by the converted program ID. Thus, the user is allowed to easily record or delete a program of the second broadcast wave simply by issuing a command for a program of the first broadcast wave without having to issue the command for the program of the second broadcast wave.

More specifically, if the user issues a command for a one-segment program by operating the portable terminal apparatus 101 that does not have the capability of receiving full-segment television programs, a corresponding full-segment program is recorded in a protected state by the home server 102 having the capability of receiving full-segment programs in a stable receiving circumstance. Because the home server 102 records not the one-segment television program but the corresponding full-segment television program, the resultant recorded television program has high image quality.

The user does not have to change the manner of issuing the command depending on whether the specified program is a past, present, or future program or a series of programs. That is, the user is allowed to issue a command such as a record command, delete command, etc., without concern for the broadcasting time of the specified program.

Use of the ID conversion table indicating the correspondence between programs of the first broadcast wave and programs of the second broadcast wave makes it possible to perform a complicated process on one or more programs. For example, in the case where a specified program is included in a series of programs, the home server 102 not only performs the specified process on the specified program but also performs a proper process on each of other programs included in the series in accordance with the ID conversion table.

In the case where the record command issued by a user is for a program that has already been deleted from the home server 102, the home server 102 may purchase the program from the content server 113 or may record the program (in a protected mode) when it is re-broadcast.

Note that such complicated processes can be performed simply by issuing a command in the same manner as described above.

The portable terminal apparatus 101 simply transmits a command and a program ID identifying a program to the home server 102 without recording the program on the portable terminal apparatus 101. Therefore, compared with the case where a program is recorded on the portable terminal apparatus 101 and the recorded data is transferred to the home server 102, information transmitted from the portable terminal apparatus 101 to the home server 102 is much less, and the information can be transmitted in a very short time. This leads to not only a reduction in processing load imposed on the portable terminal apparatus 101 or the home server 102 but also a reduction in processing load imposed on the network 110. Besides, it becomes easier to store data in a high-quality form.

In the embodiments described above, it is assumed that the home server 102 records all receivable television programs. Alternatively, the home server 102 may automatically record only particular television programs in accordance with a computer program or may record only particular television programs in accordance with settings made by a user.

Figure 11:
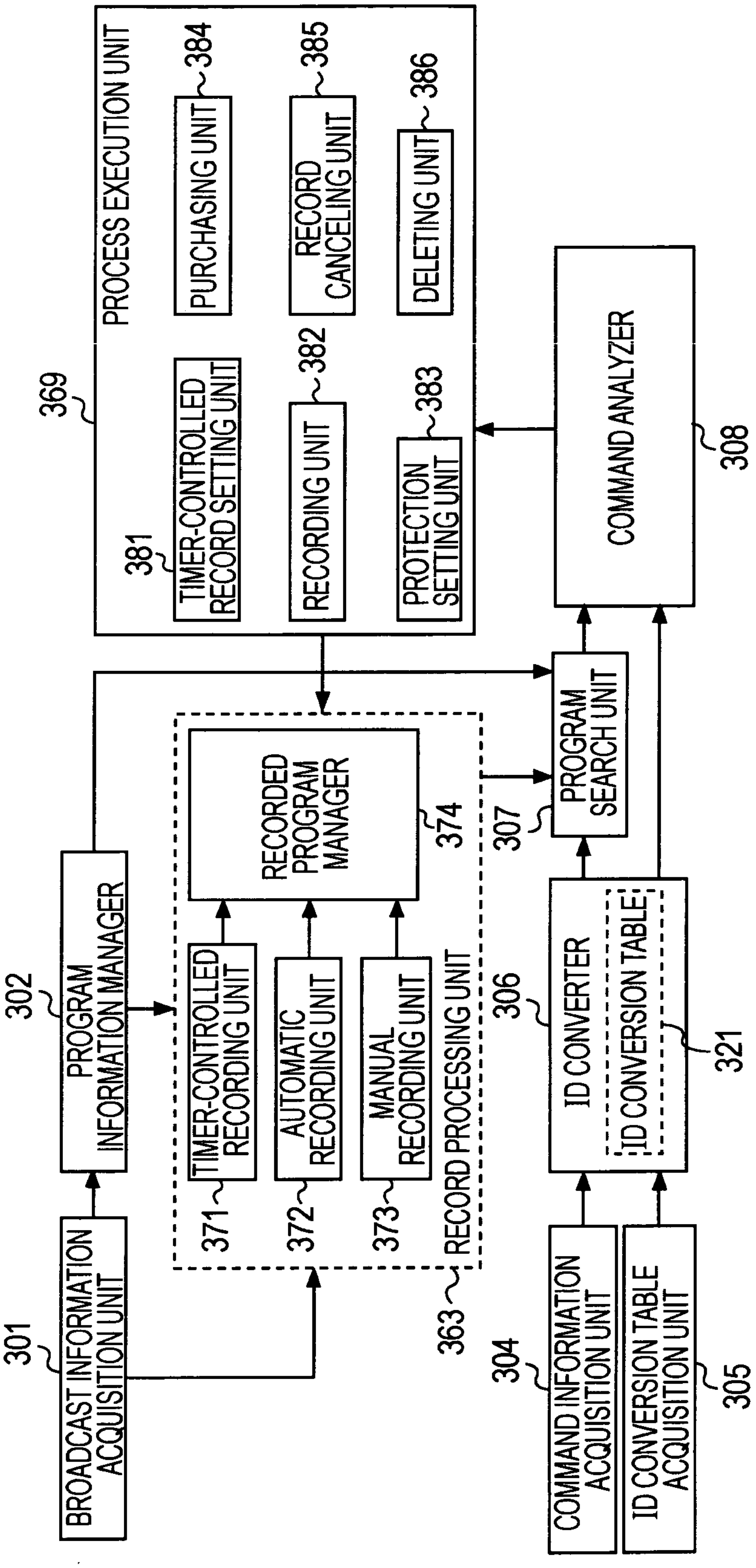
FIG. 11 is a functional block diagram of a home server.

In this case, for example, the home server 102 may be configured as shown in a functional block diagram shown in FIG. 11. In this home server 102, as shown in FIG. 11, the record processing unit 303 shown in FIG. 5 is replaced by a record processing unit 363, and the process execution unit 309 shown in FIG. 5 is replaced by a process execution unit 369.

The record processing unit 363 is adapted, as with the record processing unit 303, to perform a process associated with recording of television programs, and includes a timer-controlled recording unit 371, an automatic recording unit 372, a manual recording unit 373, and a recorded program manager 374.

The timer-controlled recording unit 371 records a television program using the tuner 211 and the storage unit 214 in accordance with a recording schedule set in advance by a user. The automatic recording unit 372 automatically records television programs using the tuner 211 and the storage unit 214 in accordance with keywords or the like specified in advance by a user. The manual recording unit 373 manually records a television program using the input unit 204, the tuner 211, and the storage unit 214 in accordance with a command issued by a user. The recorded program manager 374 manages program data recorded and stored in the storage unit 214, as with the recorded program manager 313 shown in FIG. 5.

The process execution unit 369 is adapted, as with the process execution unit 309, to perform a process determined by the command analyzer 308, and includes a timer-controlled record operation setting unit 381, a recording unit 382, a protection setting unit 383, a purchasing unit 384, a record canceling unit 385, and a deleting unit 386.

The timer-controlled record operation setting unit 381 sets the timer-controlled record operation so as to record a specified program that will be broadcast in the future. The recording unit 382 starts to record a television program being currently broadcast in response to a record start command. The protection setting unit 383 sets the data protection flag in management information associated with already-recorded television program data. The purchasing unit 384 accesses the content server 113 to purchase data of a specified program. The record canceling unit 385 stops the recording operation being currently performed. The deleting unit 386 deletes television program data from the storage unit 214.

FIG. 12 illustrates an example of an analysis pattern performed by the command analyzer 308. In the following explanation, it is assumed that there are no already-recorded television programs, and thus only a "record" command and a "delete" command are allowed.

In a case where the given command is the "record" command and a specified program is a "past" program, that is, in a case where the record command is for a full-segment television program that was already broadcast in the past, it is impossible to record the specified television program, and thus the command analyzer 308 determines that nothing should be performed as shown in a first row in the table of FIG. 12. In this case, an error message may be transmitted to the portable terminal apparatus 101.

In this case, alternatively, the command analyzer 308 may determine that the process to be performed is to record a television program when it is re-broadcast and to set the data protection flag in management information, as shown in a second row in the table of FIG. 12. Still alternatively, the command analyzer 308 may determine that the process to be performed is to purchase data of the specified program from the content server 113.

In a case where the given command is the "record" command and a specified program is a "present" program, that is, if it is instructed to delete data of a full-segment program that is currently being broadcast, the command analyzer 308 determines that the process to be performed is to immediately start recording and set the data protection flag in management information associated with the recorded television program data, as shown in a third row in the table of FIG. 12. The command analyzer 308 may determine that an additional process should be performed such that a program is fully recorded when it is re-broadcast and the partially recorded data of the program is replaced by the full data, as shown in a fourth row in the table of FIG. 12.

In a case where the given command is the "record" command and a specified program is a "future" program, that is, if it is instructed to store data of a full-segment program that will be broadcast in the future, then, as shown in a fifth row of the table shown in FIG. 12, the command analyzer 308 makes a timer-controlled record operation setting so as to record the specified television program, creates management information in advance, and sets the data protection flag in the management information.

In a case where the given command is the "record" command and a "series" of programs is specified, that is, if it is instructed to record a plurality of programs, the command analyzer 308 makes a determination as to whether corresponding full-segment programs were broadcast in the past or are currently being broadcast or will be broadcast in the future, separately for each of the programs belong to the specified series, and, in accordance with the determination result, the command analyzer 308 determines the process to be performed for each program, as shown in a sixth row in the table of FIG. 12.

In a case where the given command is the "delete" command and a specified program is a "past" program, that is, if it is instructed to delete data of a full-segment program that was broadcast in the past, the command analyzer 308 determines that the process to be performed is to delete the data of the specified program from the storage unit 214, as shown in a seventh row in the table of FIG. 12.

In a case where the given command is the "delete" command and a specified program is a "present" program, that is, if it is instructed to stop the recording operation being currently performed, the command analyzer 308 determines that the process to be performed is to stop the recording operation and delete the data of the program that has already been stored, as shown in an eighth row in the table of FIG. 12.

In a case where the given command is the "delete" command and a specified program is a "future" program, that is, if it is instructed to delete data of a full-segment program that will be broadcast in the future, the command analyzer 308 determines that nothing should be performed, as shown in a ninth row in the table of FIG. 12.

In a case where the given command is the "delete" command and a "series" of programs is specified, that is, if it is instructed to delete data of a plurality of programs, the command analyzer 308 makes a determination as to whether corresponding full-segment programs were broadcast in the past or are currently being broadcast or will be broadcast in the future, separately for each of the programs belong to the specified series, and, in accordance with the determination result, the command analyzer 308 determines the process to be performed for each program, as shown in a tenth row in the table of FIG. 12.

Note that processes performed are not limited to the examples described above, but other processes may be performed. Also note that commands are not limited to the examples described above, but other commands may be allowed.

In the embodiments described above, it is assumed, by way of example, one-segment programs are transmitted using the first broadcast wave, while full-segment programs are transmitted using the second broadcast wave. In this case, the ID conversion table 321 shown in FIG. 6 is formed so as to represent the correspondence between one-segment program IDs and full-segment program IDS, for example, as in an ID conversion table 321-1 shown in FIG. 13A. In other words, this ID conversion table 321-1 includes table information according to which a program ID of a specified program can be converted into a program ID of a corresponding program which is different in broadcast service from the original program.

However, the broadcast services provided by the broadcast station 103 are not limited to the examples described above, but the broadcast station 103 may provide any broadcast service in any form. For example, allowable broadcast services include a terrestrial analog broadcast service, a satellite broadcast service using a BS or a CS, a cable television broadcast (CATV) service, and a television broadcast service using the Internet. Therefore, the ID conversion table 321 should be produced in a proper form depending on the broadcast services provided by the broadcast station 103.

For example, both the first broadcast wave and the second broadcast wave can transmit full-segment television programs. Even in such a case, there is a possibility that the first broadcast wave and the second broadcast wave are used in different broadcasting areas and they are different in broadcasting schedule. Thus, the ID conversion table 321 is also necessary for use in such a situation. In this case, an ID conversion table such as an ID conversion table 321-2 shown in FIG. 13B is produced so as to represent the correspondence between full-segment program IDs of programs broadcast in an area A in which the first broadcast wave is used and full-segment program IDS of programs broadcast in an area B in which the second broadcast wave is used.

There is a possibility that a particular program ID corresponds to a plurality of program IDS. For example, it is allowed to let a program ID of a program belonging to a series of programs correspond to a plurality of other programs belonging to this series. In this case, as with an ID conversion table 321-3 shown in FIG. 13C, the number of program IDs described on the left-hand side of the ID conversion table is different from the number of program IDs described on the right-hand side. In the example shown in FIG. 3C, the ID conversion table 321-3 represents the correspondence between one-segment program IDS and full-segment program IDS. As described above, the ID conversion table 321-3 may be used to represent the correspondence among program IDs of various types of broadcast services. For example, the ID conversion table 321-3 may be produced so as to represent the correspondence among program IDS of the same type of broadcast service such as a full-segment broadcast service.

For example, the ID conversion table 321 may be produced so as to represent the correspondence among program IDs of programs which are different in compression format. The ID conversion table 321 may also be produced so as to represent the correspondence among program IDS of programs which are different in compression ratio.

Figure 14:
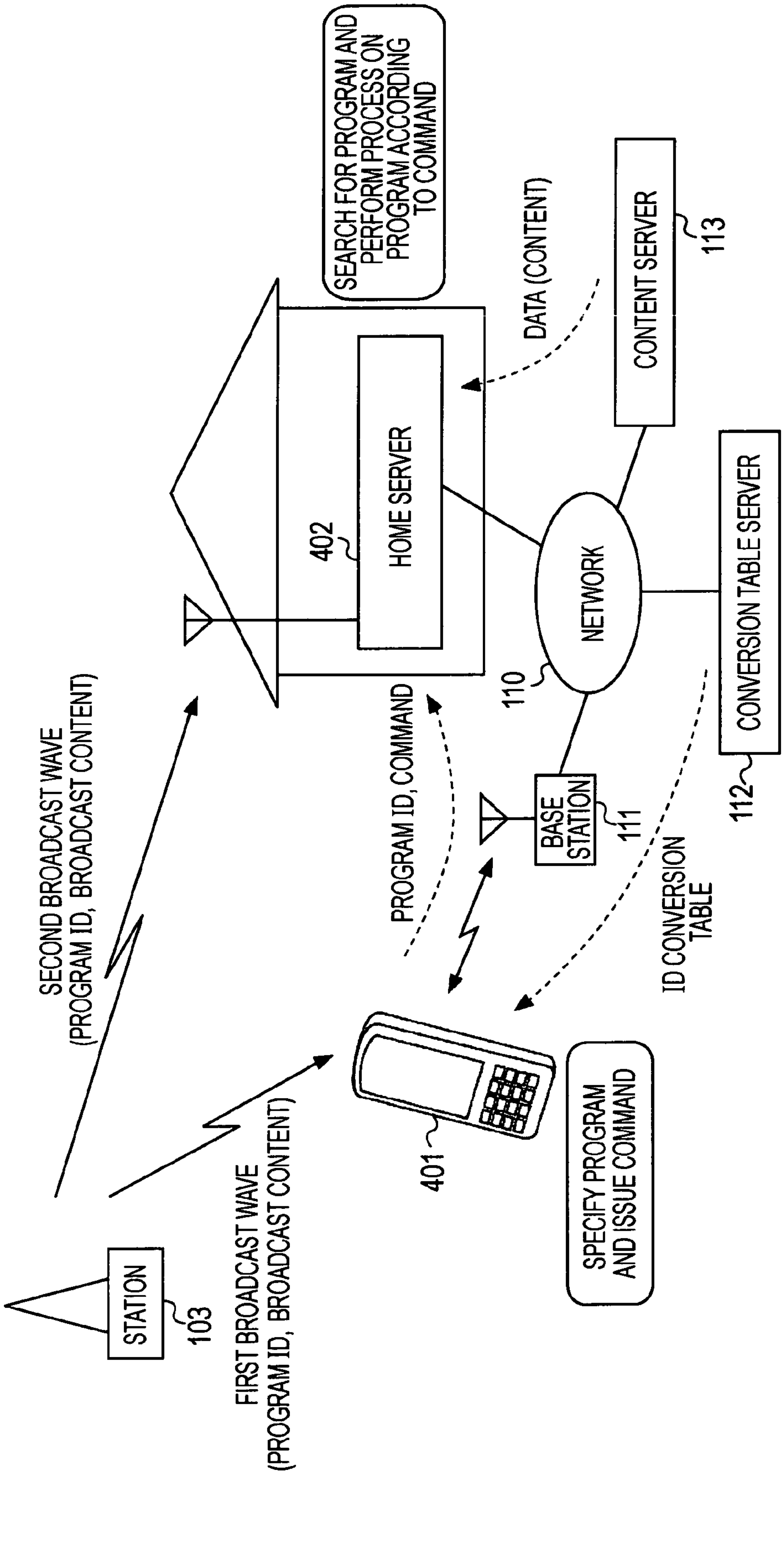
FIG. 14 is a block diagram illustrating an example of a configuration of a content recording system according to an embodiment of the present invention.

In the embodiments described above, the ID conversion process is performed by the home server 102. Alternatively, the ID conversion process may be performed by the portable terminal apparatus 101. In this case, the system may be configured, for example, as shown in FIG. 14. The system shown in FIG. 14 is similar to that shown in FIG. 1 except that a portable terminal apparatus 401 acquires an ID conversion table from a conversion table server 112, and a program ID obtained as a result of the conversion process performed according to the acquired ID conversion table is supplied to the home server 402 from the portable terminal apparatus 401.

In the system shown in FIG. 14, the home server 402 is similar to the home server 102 shown in FIG. 1 except that the home server 402 does not receive the ID conversion table and does not perform the ID conversion process.

More specifically, the portable terminal apparatus 401 additionally includes the ID conversion table acquisition unit 305 and the ID converter 306 shown in FIG. 5 in addition to the functional blocks shown in FIG. 4, and the command supply unit 255 is adapted to supply a program ID converted by the ID converter 306 and a command accepted by the command accepting unit 254 to the home server 402.

On the other hand, the home server 402 is configured to include all functional blocks shown in FIG. 5 excluding the ID conversion table acquisition unit 305 and the ID converter 306.

Figure 15:
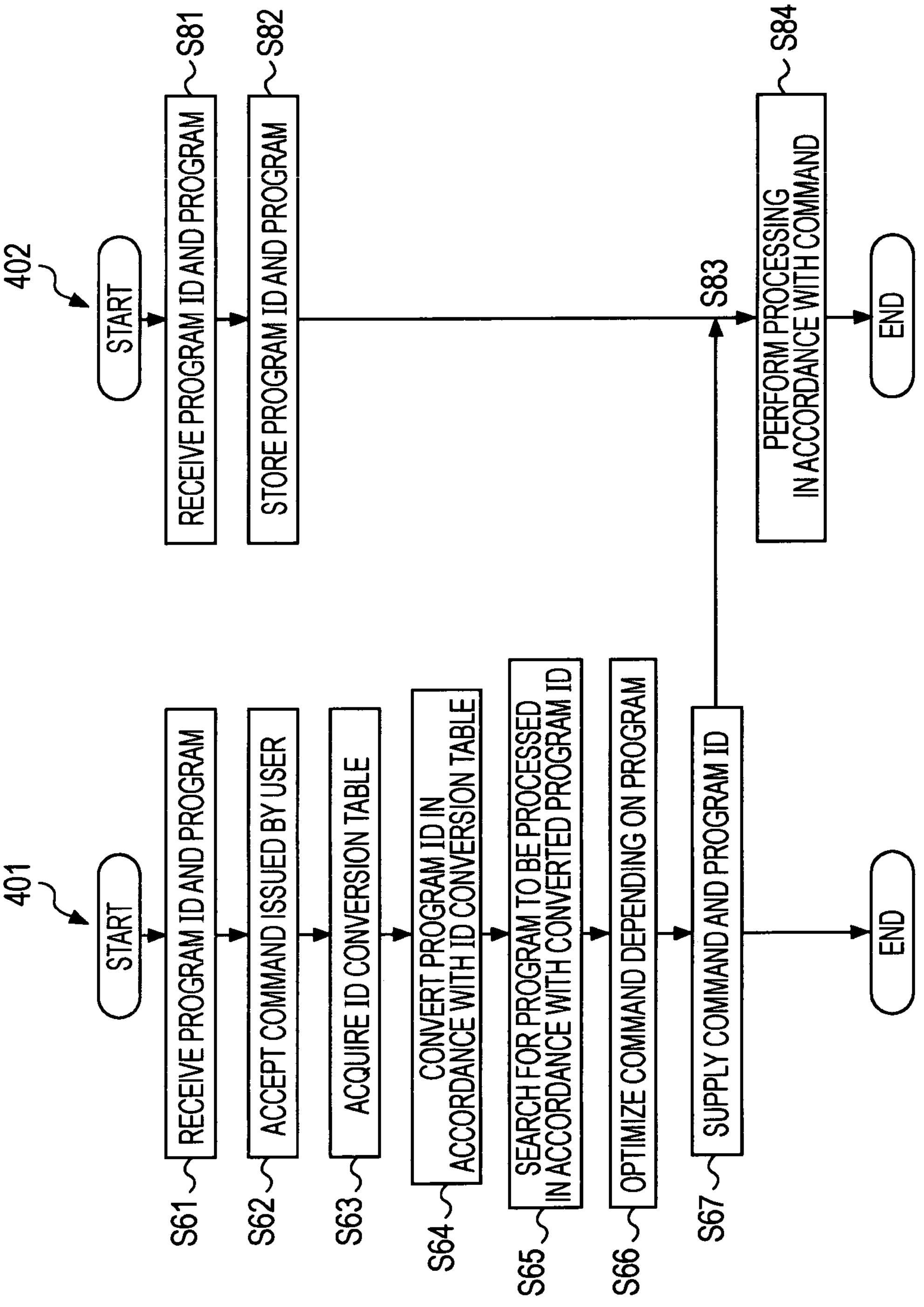
FIG. 15 is a flow chart illustrating an example of a processing flow associated with a total operation performed in the system shown in FIG. 14, in accordance with an operation command.

In this system, the process is performed as described below with reference to a flow chart shown in FIG. 15 corresponding to the flow chart shown in FIG. 9. After the portable terminal apparatus 401 performs step S61 and step S62 in a similar manner to steps S21 and S22, the portable terminal apparatus 401 performs steps S63 to S66 in a similar manner to steps S44 to S47 thereby converting a given program ID and determining an optimum process to be performed depending on the converted program ID. Note that instead of performing steps S65 and S66 on the portable terminal apparatus 401, these two steps may be performed on the home server 402.

In step S67, the portable terminal apparatus 401 supplies the program ID and the command to the home server 402 in a similar manner to step S23.

The home server 402 performs steps S81 and S82 in a similar manner to steps S41 and S42. In step S83, the home server 402 acquires the program ID and the command supplied from the portable terminal apparatus 401 in a similar manner to step S43.

If the program ID and the command are acquired, then, in step S84, the home server 402 performs a process according to the acquired command in a similar manner to step S48.

In the present embodiment, as described above, because the conversion of program IDs is performed by the portable terminal apparatus, a reduction in processing load imposed on the home server is achieved. This is useful in particular in a circumstance in which there a large number of portable terminal apparatuses related to a single home server.

Figure 16:
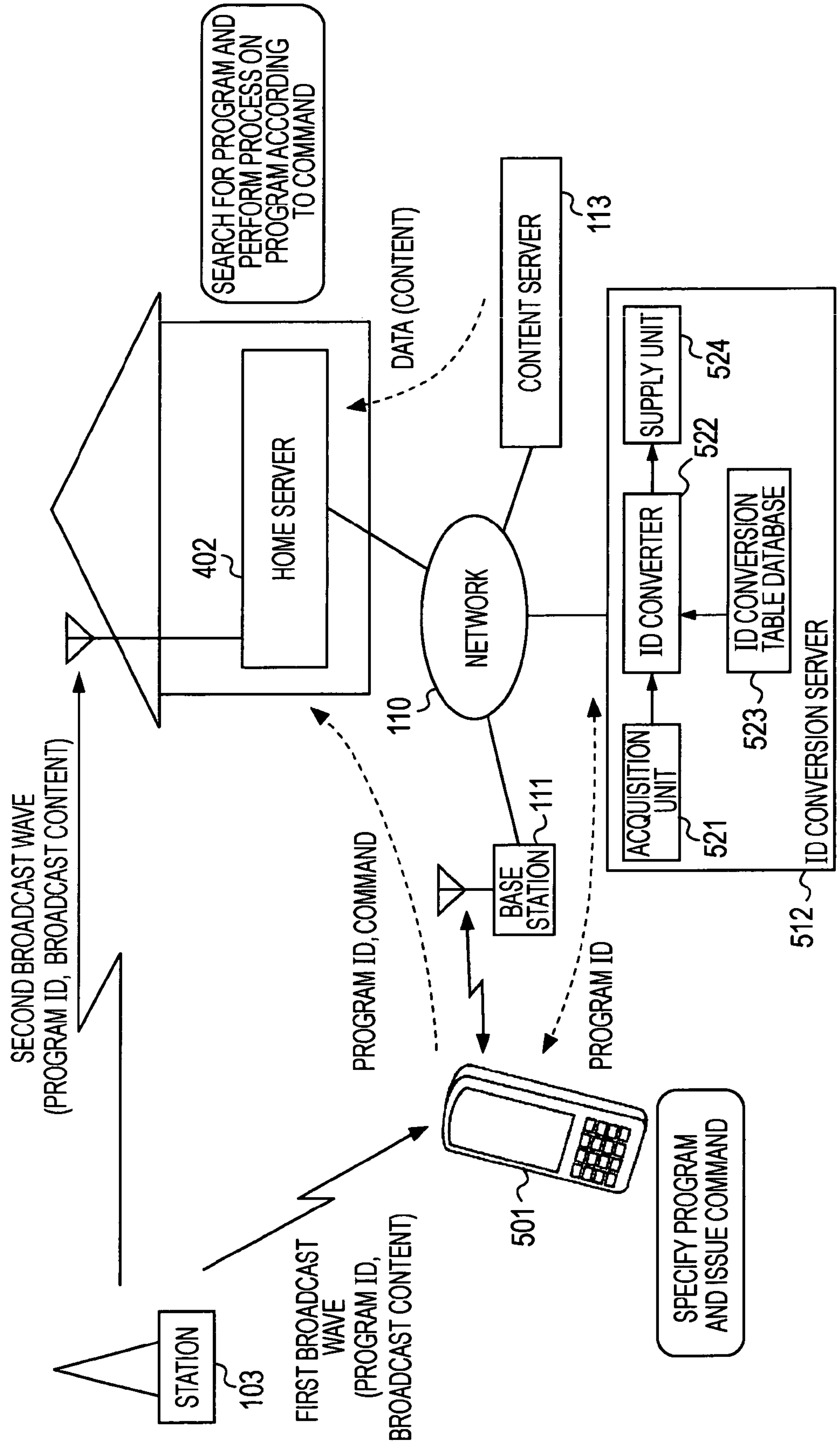
FIG. 16 is a block diagram illustrating an example of a configuration of a content recording system according to an embodiment of the present invention.

Alternatively, the conversion of program IDs may be performed by another apparatus installed separately. In this case, the system may be configured, for example, as shown in FIG. 16. In the system shown in FIG. 16, the conversion of program IDs is performed by an ID conversion server 512 connected to a network 110. As shown in FIG. 16, the system includes a portable terminal apparatus 501 and a home server 402.

The portable terminal apparatus 501 has a similar configuration and operates in a similar manner to the portable terminal apparatus 101 except that before a program ID and a command are supplied to the home server 402, the portable terminal apparatus 501 requests the ID conversion server 512 to convert the program ID of the first broadcast wave into a corresponding program ID of the second broadcast wave and the portable terminal apparatus 501 supplies the converted program ID of the second broadcast wave and the command to the home server 402.

If the home server 402 receives the converted program ID and the command, the home server 402 performs a process on a program identified by the received program ID in accordance with the received command.

The ID conversion server 512 includes an acquisition unit 521, an ID conversion processing unit 522, an ID conversion table database 523, and a supply unit 524.

The acquisition unit 521 acquires a program ID of the first broadcast wave supplied from the portable terminal apparatus 501 via the network 110. The ID conversion processing unit 522 converts the program ID in accordance with an ID conversion table supplied from the ID conversion table database 523. The ID conversion table database 523 manages ID conversion tables and supplies a necessary ID conversion table in accordance with a request from the ID conversion processing unit 522. The supply unit 524 supplies the converted program ID to the portable terminal apparatus 501 via the network 110.

Figure 17:
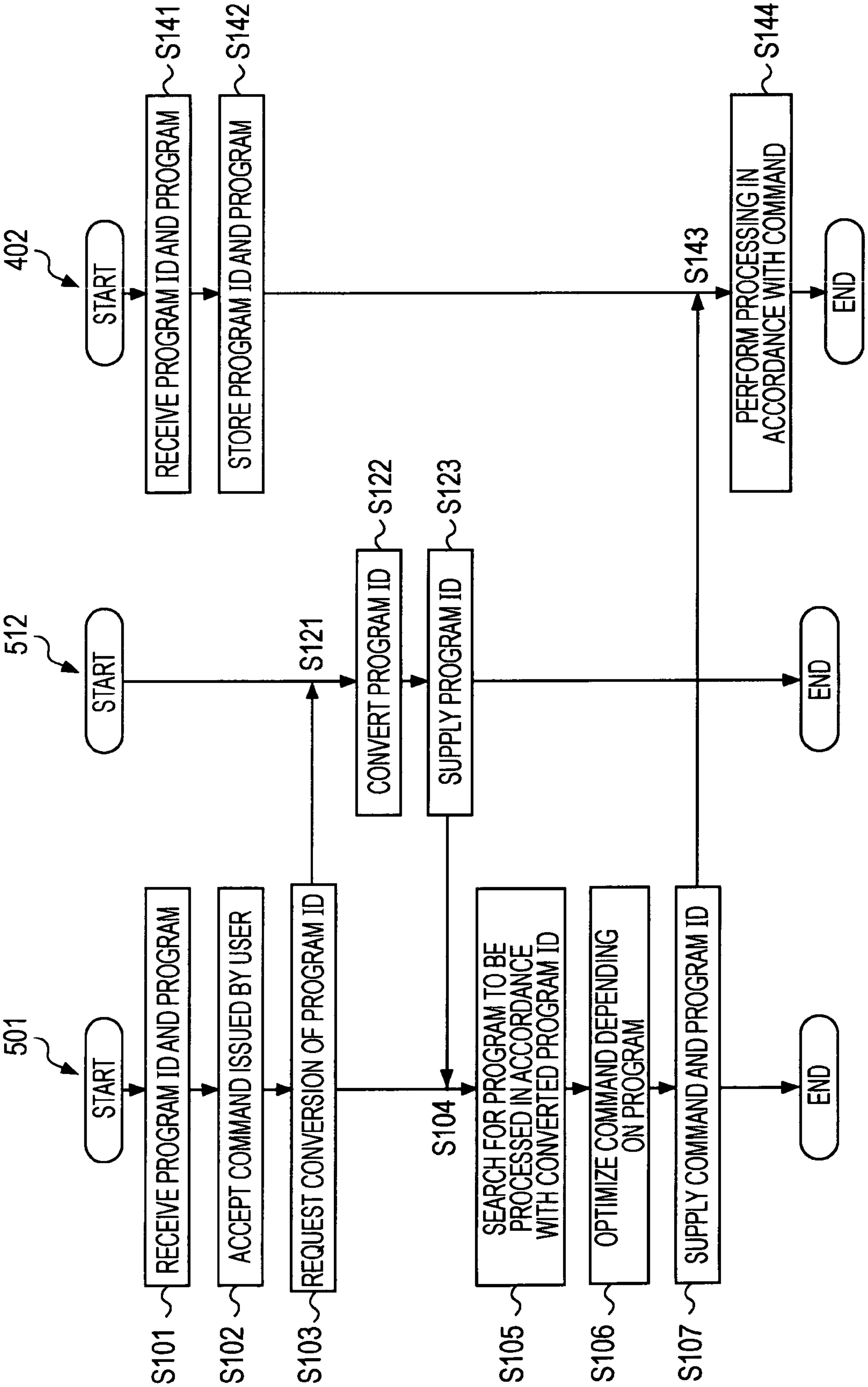
FIG. 17 is a flow chart illustrating an example of a processing flow associated with a total operation performed in the system shown in FIG. 16, in accordance with an operation command.

In this system, the process is performed as described below with reference to a flow chart shown in FIG. 17 corresponding to the flow chart shown in FIG. 15.

The portable terminal apparatus 501 performs steps S101 and S102 in a similar manner to steps S61 and S62, and the home server 402 performs steps S141 and S142 in a similar manner to steps S81 and S82.

If the portable terminal apparatus 501 accepts a command issued by a user, then, in step S103, the portable terminal apparatus 501 transmits a program ID conversion request together with the program ID of a program of the first broadcast wave specified by the user to the ID conversion server 512.

If the ID conversion server 512 receives, in step S121, the program ID and the conversion request, then, in step S122, the ID conversion server 512 converts the received program ID into a program ID of a program of the second broadcast wave corresponding to the received program ID in accordance with the ID conversion table. In step S123, the ID conversion server 512 supplies the resultant program ID of the second broadcast wave to the portable terminal apparatus 501.

If the portable terminal apparatus 501 receives, in step S104, the program ID converted by the ID conversion server 512, then the portable terminal apparatus 501 performs steps S105 to S107 in a similar manner to steps S65 to S67, and supplies the command and the program ID of the second broadcast wave to the home server 402.

The home server 402 performs steps S143 and S144, in a similar manner to steps S83 and S84, to perform a process on the program identified by the received program ID in accordance with the received command.

Steps S105 and S106 may be performed not by portable terminal apparatus 501 but by the home server 402.

In the present embodiment, as described above, the conversion of program IDs is performed by the ID conversion server 512 in accordance with the ID conversion table, and thus a user of the portable terminal apparatus 501 is allowed to easily perform a process associated with data storage such as recording or deleting. Furthermore, use of the ID conversion server 512 to perform the conversion of program IDs allows a reduction in processing load imposed on the portable terminal apparatus and a reduction in processing load imposed on the home server. This allows a reduction in cost of the portable terminal apparatus and the home server.

Also in the system according to the present embodiment as in the system shown in FIG. 1 according to the previous embodiments, it is possible to easily perform a complicated process such as protecting or deleting for a series of programs or the like.

In the system shown in FIG. 16, the ID conversion server 512 supplies the converted program ID to the portable terminal apparatus 501. Alternatively, the converted program ID may be supplied to the home server 402. In this case, when the portable terminal apparatus 501 sends the conversion request to the ID conversion server 512, the portable terminal apparatus 501 specifies a destination (the home server 402, in the present example) to which the converted program ID should be sent, and the portable terminal apparatus 501 separately sends the command to the home server 402.

In the embodiments described above, the portable terminal apparatus communicates with the home server via the network 110. Alternatively, the communication may be performed in a one-to-one fashion using a short-range wireless communication technique such as an infrared communication technique or a Bluetooth communication technique, or a communication technique using a cable according to the USB (Universal Serial Bus) standard, the IEEE ((Institute of Electrical and Electronic Engineers) 1394 standard, or the like.

In the above explanation, for simplicity, it is assumed that the system includes only one piece of each apparatus. However, there is no particular restriction on the number of each type of apparatuses, and the system may include a plurality of each type of apparatuses.

In the embodiments described above, it is assumed that contents identified by IDs converted by the ID conversion table are broadcast contents. However, contents are not limited to broadcast contents. The ID conversion table may be used to convert an ID into an ID identifying any content to be acquired by a terminal apparatus, and the broadcast station 103 may provide any content in any form. For example, the content may be a streaming content provided by an IPTV (Internet Protocol Television) server or a downloaded content obtained by a client by downloading from a server. In such a case, the broadcast station 103 is replaced by a server or the like.

The sequence of processing steps described above may be performed by means of hardware or software. In the case where the processing sequence is executed by software, a program functioning as the software may be installed from a program storage medium onto a computer which is provided as dedicated hardware or may be installed onto a general-purpose computer or an information processing system including a plurality of apparatuses capable of performing various processes in accordance with various programs installed thereon.

An example of such a storage medium usable for the above purpose is a removable medium, such as the removable medium 172 or 222 shown in FIG. 2 or 3, on which a program is stored and which is supplied to a user separately from a computer. Specific examples include a magnetic disk (such as a floppy disk), an optical disk (such as a CD-ROM (Compact Disk-Read Only Memory) and a DVD (Digital Versatile Disk)), a magnetooptical disk (such as an MD (Mini-Disk, trademark)), and a semiconductor memory. A program may be preinstalled on a ROM 152 or 202 or a hard disk or the like in a storage unit 164 or 214 of a computer or an apparatus.

In the present description, the steps described in the program stored in the storage medium may be performed either in time sequence in accordance with the order described in the program or in a parallel or separate fashion.

In the present description, the term "system" is used to describe the entirety of an apparatus including a plurality of devices of sub-apparatuses.

Any single apparatus described above may be divided into a plurality of apparatus as long as the function of the original apparatus can be achieved as a whole. Conversely, any apparatuses may be combined into a single apparatus, if possible. Each apparatus may include any additional part. A particular part of any apparatus may be included in another proper apparatus, as long as the overall functions of the system can be achieved.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:

conversion means for converting identification information identifying a specified broadcast content into identification information identifying another broadcast content corresponding to the originally specified broadcast content, in accordance with table information indicating a correspondence among a plurality of pieces of identification information respectively identifying broadcast contents thereby indicating a correspondence among the broadcast contents, the conversion means acquires the table information by supplying the identification information identifying a specified broadcast to a server and requesting that the server provide table information corresponding to the identification information identifying a specified broadcast, the server providing the table information in response to the request, the conversion means acquires the table information in response to receiving the identification information and a generated command from a portable device, the generated command being a command generated in response to the input of an operation command to the portable device, the operation command directing the portable device to perform a particular process on a low resolution version of a program, and the generated command directing the information processing apparatus to perform the particular process on a high resolution version of the program, wherein the particular process comprises at least one of setting a timer-controlled recording operation so as to record a television program that will be broadcast in the future, canceling a recording operation being currently performed, protecting specified television program data, canceling protection for specified television program data, and deleting specified television program data, and wherein a first acquisition means acquires identification information and command information both supplied from an external apparatus, the command information specifying a process to be performed on a broadcast content identified by the identification information; a second acquisition means acquires the table information from the external apparatus, the conversion means converts, in accordance with the table information acquired by the second acquisition means, the identification information acquired by the first acquisition means into identification information identifying another broadcast content corresponding to the broadcast content identified by the identification information acquired by the first acquisition means, a search means searches for the broadcast content identified by the identification information given as the result of the conversion performed by the conversion means, a determination means determines the specific process, corresponding to the process specified by the command information acquired by the first acquisition means, to be actually performed on the broadcast content detected as the result of the search performed by the search means, and a process execution means executes a specific process determined by the determination means; third acquisition means acquires the broadcast content and the identification information; and storage control means stores the broadcast content acquired by the third acquisition means in a storage unit, the process specified by the command information being a process associated with a control of the storage control means.

2. The information processing apparatus according to claim 1, wherein the conversion means converts, in accordance with the table information, the identification information identifying the specified broadcast content into identification information identifying another broadcast content that corresponds to the originally specified broadcast content and that is different in a compression format from the originally specified broadcast content.

3. The information processing apparatus according to claim 1, wherein the conversion means converts, in accordance with the table information, the identification information identifying the specified broadcast content into identification information identifying another broadcast content that corresponds to the originally specified broadcast content and that is different in a broadcasting area from the originally specified broadcast content.

4. The information processing apparatus according to claim 1, wherein the conversion means converts, in accordance with the table information, the identification information identifying the specified broadcast content into identification information identifying another broadcast content that corresponds to the originally specified broadcast content and that is different in a compression ratio from the originally specified broadcast content.

5. The information processing apparatus according to claim 1, wherein the conversion means converts, in accordance with the table information, the identification information identifying the specified broadcast content into a plurality of pieces of identification information identifying other broadcast contents corresponding to the originally specified broadcast content.

6. The information processing apparatus according to claim 1, wherein the conversion means converts, in accordance with the table information, the identification information identifying the specified broadcast content into identification information identifying another broadcast content that corresponds to the originally specified broadcast content and that is different in a broadcast service from the originally specified broadcast content.

7. The information processing apparatus according to claim 1, further comprising:

acceptance means for accepting identification information input by a user and command information input by the user and specifying a process to be performed on a broadcast content identified by the identification information; and supply means for supplying the command information and the identification information to an external apparatus, wherein the conversion means converts, in accordance with the table information, the identification information accepted by the acceptance means into identification information identifying another broadcast content corresponding to the originally specified broadcast content, and the supply means supplies the command information accepted by the acceptance means to the external apparatus together with the identification information given as a result of the conversion performed by the conversion means.

8. An information processing method comprising using a processing unit to perform the step of:

converting identification information identifying a specified broadcast content into identification information identifying another broadcast content corresponding to the originally specified broadcast content, in accordance with table information indicating a correspondence among a plurality of pieces of identification information respectively identifying broadcast contents thereby indicating a correspondence among the broadcast contents, the step of converting comprises acquiring the table information by supplying the identification information identifying a specified broadcast to a server and requesting that the server provide table information corresponding to the identification information identifying a specified broadcast, the server providing the table information in response to the request, acquiring the table information in response to receiving the identification information and a generated command from a portable device, the generated command being a command generated in response to the input of an operation command to the portable device, the operation command directing the portable device to perform a particular process on a low resolution version of a program, and the generated command directing the processing unit to perform the particular process on a high resolution version of the program, wherein the particular process comprises at least one of setting a timer-controlled recording operation so as to record a television program that will be broadcast in the future, canceling a recording operation being currently performed, protecting specified television program data, canceling protection for specified television program data, and deleting specified television program data, and wherein a first acquisition means acquires identification information and command information both supplied from an external apparatus, the command information specifying a process to be performed on a broadcast content identified by the identification information; a second acquisition means acquires the table information from the external apparatus, the conversion means converts, in accordance with the table information acquired by the second acquisition means, the identification information acquired by the first acquisition means into identification information identifying another broadcast content corresponding to the broadcast content identified by the identification information acquired by the first acquisition means, a search means searches for the broadcast content identified by the identification information given as the result of the conversion performed by the conversion means, a determination means determines the specific process, corresponding to the process specified by the command information acquired by the first acquisition means, to be actually performed on the broadcast content detected as the result of the search performed by the search means, and a process execution means executes a specific process determined by the determination means; third acquisition means acquires the broadcast content and the identification information; and storage control means stores the broadcast content acquired by the third acquisition means in a storage unit, the process specified by the command information being a process associated with a control of the storage control means.

9. A non-transitory computer-readable medium storing a computer program executable by a computer to perform information processing comprising the step of:

converting identification information identifying a specified broadcast content into identification information identifying another broadcast content corresponding to the originally specified broadcast content, in accordance with table information indicating a correspondence among a plurality of pieces of identification information respectively identifying broadcast contents thereby indicating a correspondence among the broadcast contents, the step of converting comprises acquiring the table information by supplying the identification information identifying a specified broadcast to a server and requesting that the server provide table information corresponding to the identification information identifying a specified broadcast, the server providing the table information in response to the request, acquiring the table information in response to receiving the identification information and a generated command from a portable device, the generated command being a command generated in response to the input of an operation command to the portable device, the operation command directing the portable device to perform a particular process on a low resolution version of a program, and the generated command directing the computer to perform the particular process on a high resolution version of the program, wherein the particular process comprises at least one of setting a timer-controlled recording operation so as to record a television program that will be broadcast in the future, canceling a recording operation being currently performed, protecting specified television program data, canceling protection for specified television program data, and deleting specified television program data, and wherein a first acquisition means acquires identification information and command information both supplied from an external apparatus, the command information specifying a process to be performed on a broadcast content identified by the identification information; a second acquisition means acquires the table information from the external apparatus, the conversion means converts, in accordance with the table information acquired by the second acquisition means, the identification information acquired by the first acquisition means into identification information identifying another broadcast content corresponding to the broadcast content identified by the identification information acquired by the first acquisition means, a search means searches for the broadcast content identified by the identification information given as the result of the conversion performed by the conversion means, a determination means determines the specific process, corresponding to the process specified by the command information acquired by the first acquisition means, to be actually performed on the broadcast content detected as the result of the search performed by the search means, and a process execution means executes a specific process determined by the determination means; third acquisition means acquires the broadcast content and the identification information; and storage control means stores the broadcast content acquired by the third acquisition means in a storage unit, the process specified by the command information being a process associated with a control of the storage control means.

10. An information processing system including a first apparatus and a second apparatus, the first apparatus including acceptance means for accepting identification information and command information both input by a user, the identification information identifying a broadcast content, the command information identifying a process to be performed on the broadcast content identified by the identification information, and supply means for supplying the command information and the identification information to the second apparatus, the second apparatus including acquisition means for acquiring the identification information and the command information supplied from the first apparatus, conversion means for converting identification information acquired by the acquisition means into identification information identifying another broadcast content corresponding to the broadcast content identified by the identification information acquired by the acquisition means, in accordance with table information indicating a correspondence among a plurality of pieces of identification information respectively identifying broadcast contents thereby indicating a correspondence among the broadcast contents, and process execution means for executing a process specified by the command information acquired by the acquisition means on the broadcast content identified by the identification information given as a result of the conversion performed by the conversion means, the conversion means acquires the table information by supplying the identification information acquired by the acquisition means to a server and requesting that the server provide table information corresponding to the identification information acquired by the acquisition means, the server providing the table information in response to the request, the conversion means acquires the table information in response to receiving the identification information and a generated command from the first apparatus, the generated command being a command generated in response to the input of an operation command to the first apparatus, the operation command directing the first apparatus to perform a particular process on a low resolution version of a program, and the generated command directing the second apparatus to perform the particular process on a high resolution version of the program, wherein the particular process comprises at least one of setting a timer-controlled recording operation so as to record a television program that will be broadcast in the future, canceling a recording operation being currently performed, protecting specified television program data, canceling protection for specified television program data, and deleting specified television program data, and wherein a first acquisition means acquires identification information and command information both supplied from an external apparatus, the command information specifying a process to be performed on a broadcast content identified by the identification information; a second acquisition means acquires the table information from the external apparatus, the conversion means converts, in accordance with the table information acquired by the second acquisition means, the identification information acquired by the first acquisition means into identification information identifying another broadcast content corresponding to the broadcast content identified by the identification information acquired by the first acquisition means, a search means searches for the broadcast content identified by the identification information given as the result of the conversion performed by the conversion means, a determination means determines the specific process, corresponding to the process specified by the command information acquired by the first acquisition means, to be actually performed on the broadcast content detected as the result of the search performed by the search means, and a process execution means executes a specific process determined by the determination means; third acquisition means acquires the broadcast content and the identification information; and storage control means stores the broadcast content acquired by the third acquisition means in a storage unit, the process specified by the command information being a process associated with a control of the storage control means.

11. An information processing apparatus comprising:

a conversion unit adapted to convert identification information identifying a specified broadcast content into identification information identifying another broadcast content corresponding to the originally specified broadcast content, in accordance with table information indicating a correspondence among a plurality of pieces of identification information respectively identifying broadcast contents thereby indicating a correspondence among the broadcast contents, the conversion unit acquires the table information by supplying the identification information identifying a specified broadcast to a server and requesting that the server provide table information corresponding to the identification information identifying a specified broadcast, the server providing the table information in response to the request, the conversion unit acquires the table information in response to receiving the identification information and a generated command from a portable device, the generated command being a command generated in response to the input of an operation command to the portable device, the operation command directing the portable device to perform a particular process on a low resolution version of a program, and the generated command directing the information processing apparatus to perform the particular process on a high resolution version of the program, wherein the particular process comprises at least one of setting a timer-controlled recording operation so as to record a television program that will be broadcast in the future, canceling a recording operation being currently performed, protecting specified television program data, canceling protection for specified television program data, and deleting specified television program data, and wherein a first acquisition means acquires identification information and command information both supplied from an external apparatus, the command information specifying a process to be performed on a broadcast content identified by the identification information; a second acquisition means acquires the table information from the external apparatus, the conversion means converts, in accordance with the table information acquired by the second acquisition means, the identification information acquired by the first acquisition means into identification information identifying another broadcast content corresponding to the broadcast content identified by the identification information acquired by the first acquisition means, a search means searches for the broadcast content identified by the identification information given as the result of the conversion performed by the conversion means, a determination means determines the specific process, corresponding to the process specified by the command information acquired by the first acquisition means, to be actually performed on the broadcast content detected as the result of the search performed by the search means, and a process execution means executes a specific process determined by the determination means; third acquisition means acquires the broadcast content and the identification information; and storage control means stores the broadcast content acquired by the third acquisition means in a storage unit, the process specified by the command information being a process associated with a control of the storage control means.

12. An information processing system including a first apparatus and a second apparatus, the first apparatus including an accepting unit adapted to accept identification information and command information both input by a user, the identification information identifying a broadcast content, the command information identifying a process to be performed on the broadcast content identified by the identification information, and a supply unit adapted to supply the command information and the identification information to the second apparatus, the second apparatus including an acquisition unit adapted to acquire the identification information and the command information supplied from the first apparatus, a conversion unit adapted to convert identification information acquired by the acquisition unit into identification information identifying another broadcast content corresponding to the broadcast content identified by the identification information acquired by the acquisition unit, in accordance with table information indicating a correspondence among a plurality of pieces of identification information respectively identifying broadcast contents thereby indicating a correspondence among the broadcast contents, and a process execution unit adapted to execute a process specified by the command information acquired by the acquisition unit on the broadcast content identified by the identification information given as a result of the conversion performed by the conversion unit, the conversion unit acquires the table information by supplying the identification information acquired by the acquisition unit to a server and requesting that the server provide table information corresponding to the identification information acquired by the acquisition unit, the server providing the table information in response to the request, the conversion unit acquires the table information in response to receiving the identification information and a generated command from the first apparatus, the generated command being a command generated in response to the input of an operation command to the first apparatus, the operation command directing the first apparatus to perform a particular process on a low resolution version of a program, and the generated command directing the second apparatus to perform the particular process on a high resolution version of the program, wherein the particular process comprises at least one of setting a timer-controlled recording operation so as to record a television program that will be broadcast in the future, canceling a recording operation being currently performed, protecting specified television program data, canceling protection for specified television program data, and deleting specified television program data, and wherein a first acquisition means acquires identification information and command information both supplied from an external apparatus, the command information specifying a process to be performed on a broadcast content identified by the identification information; a second acquisition means acquires the table information from the external apparatus, the conversion means converts, in accordance with the table information acquired by the second acquisition means, the identification information acquired by the first acquisition means into identification information identifying another broadcast content corresponding to the broadcast content identified by the identification information acquired by the first acquisition means, a search means searches for the broadcast content identified by the identification information given as the result of the conversion performed by the conversion means, a determination means determines the specific process, corresponding to the process specified by the command information acquired by the first acquisition means, to be actually performed on the broadcast content detected as the result of the search performed by the search means, and a process execution means executes a specific process determined by the determination means; third acquisition means acquires the broadcast content and the identification information; and storage control means stores the broadcast content acquired by the third acquisition means in a storage unit, the process specified by the command information being a process associated with a control of the storage control means.

* * * * *